US011948509B2

United States Patent
(12) United States Patent
Choi et al.

(10) Patent No.: US 11,948,509 B2
(45) Date of Patent: Apr. 2, 2024

(54) UNDER-DISPLAY SENSOR OPERATION

(71) Applicant: Google LLC, Mountain View, CA (US)

(72) Inventors: Sangmoo Choi, Palo Alto, CA (US); Yi Zhang, San Diego, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/000,904

(22) PCT Filed: Aug. 31, 2020

(86) PCT No.: PCT/US2020/048795
§ 371 (c)(1),
(2) Date: Dec. 6, 2022

(87) PCT Pub. No.: WO2022/010508
PCT Pub. Date: Jan. 13, 2022

(65) Prior Publication Data

US 2023/0222976 A1 Jul. 13, 2023

Related U.S. Application Data

(60) Provisional application No. 63/048,501, filed on Jul. 6, 2020.

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ........ G06F 21/32; G01V 8/12; G09G 3/3233; G09G 3/3258
See application file for complete search history.

(56) References Cited

U.S. PATENT DOCUMENTS 8,970,577 B2 3/2015 Lillie et al.
2018/0173923 A1* 6/2018 Lee ........................ G06F 3/0443
(Continued)

FOREIGN PATENT DOCUMENTS

WO 2015050888 A1 4/2015

OTHER PUBLICATIONS

International Preliminary Report on Patentability from International Application No. PCT/US2020/048795 dated Jan. 19, 2023, 19 pp.
(Continued)

*Primary Examiner* — Sardis F Azongha
(74) *Attorney, Agent, or Firm* — Shumaker & Sieffert, P.A.

(57) ABSTRACT

An example method includes programming, during non-emission periods of frames of a plurality of frames based on image data of the frames, pixels of the plurality of pixels of a display of a computing device; causing, during emission periods of the frames, pixels of the plurality of pixels to emit light, wherein an amount of light emitted by the pixels during an emission period of a particular frame is based on the programming for the particular frame; and synchronizing operation of one or more sensors and operation of the plurality of pixels by at least causing the one or more sensors to alternatingly emit, through the display, electromagnetic radiation during emission periods and non-emission periods.

28 Claims, 15 Drawing Sheets

(52) U.S. Cl.
CPC ............... *G09G 2300/0861* (2013.01); *G09G 2320/0233* (2013.01); *G09G 2330/06* (2013.01)

(56) References Cited

U.S. PATENT DOCUMENTS

| | | | | |
|---|---|---|---|---|
| 2019/0287463 | A1* | 9/2019 | Zhang | G09G 3/3258 |
| 2020/0042759 | A1 | 2/2020 | Kim et al. | |
| 2020/0117782 | A1 | 4/2020 | Lee et al. | |
| 2021/0063816 | A1* | 3/2021 | He | G02F 1/133615 |

OTHER PUBLICATIONS

International Search Report and Written Opinion of International Application No. PCT/US2020/048795 dated Feb. 26, 2021, 24 pp.
Response to Communication Pursuant to Rules 161(1) and 162 EPC dated Oct. 19, 2022, from counterpart European Application No. 20771722.4, filed Mar. 10, 2023, 22 pp.

* cited by examiner

UNDER-DISPLAY SENSOR OPERATION

This application claims the benefit of U.S. Provisional Application Ser. No. 63/048,501, filed Jul. 6, 2020, the entire contents of which are hereby incorporated by reference.

BACKGROUND

Computing devices, such as cellular phones and so-called smartphones, may include a display by which to present images (including sequences of images forming videos, animations, etc. and/or computer-generated user interfaces and other forms of images). As smartphones and other types of power-limited devices, such as laptop computers, smart-watches, smart-glasses, smart-hubs, extended reality (XR) devices, and the like, may consume power from power limited sources, such as a battery, these power-limited devices may employ more power-efficient displays, such as organic light emitting diode (OLED) displays (including active-matrix OLED-AMOLED displays), compared to ordinary LED displays.

Further, to provide for a more comfortable viewing experience, the power-limited devices may employ larger displays. To increase the size of displays, various sensors may be configured to operate underneath the display (which may be referred to as "under-display sensors"), and thereby avoid notches, holes, or other modification to the display that detract from the viewing experience. While the size and shape of displays that allow for under-display sensors (which may be referred to as "pass-through displays") may improve compared to displays having notches, holes, or other modifications (which may be referred to as "modified displays"), the pass-through displays may present images that include more noise compared to images presented by the modified displays.

SUMMARY

Various aspects of the techniques are directed to a computing device configured to synchronize operation of a display (such as an organic light emitting diode—OLED—display or active matrix OLED—AMOLED—display) with operation of sensors located under the display that operate through the display. When operating, one or more sensors located under the display may emit electromagnetic radiation that passes through the display. For instance, a proximity sensor may emit infrared (IR) light through the display, receive a return signal that includes some of the emitted light, and determine a distance between the sensor and another object based on the return signal. Emission of electromagnetic radiation by the one or more sensors may interfere with operation of the display. For instance, the electromagnetic radiation may alter luminance values of one or more pixels in the display, which may be undesirably visible to a user. In accordance with one or more techniques of this disclosure, the computing device may synchronize operation of the sensor with operation of the display. For instance, the one or more sensors may emit the electromagnetic radiation at an opportune time of display operation (e.g., just before pixels of the display are to be programmed) so as to minimize visible effects of luminance value alteration.

Various aspects of the techniques are directed to a computing device configured to synchronize operation of a display (such as an organic light emitting diode—OLED—display or active matrix OLED—AMOLED—display) with operation of sensors located under the display that operate through the display. When operating, one or more sensors located under the display may emit electromagnetic radiation that passes through the display. For instance, a proximity sensor may emit infrared (IR) light through the display, receive a return signal that includes some of the emitted light, and determine a distance between the sensor and another object based on the return signal. Emission of electromagnetic radiation by the one or more sensors may interfere with operation of the display, such as by altering luminance values of one or more pixels in the display, which may be undesirably visible to a user. Depending on the timing of the emission of the electromagnetic radiation, the luminance values may be increased or decreased. In accordance with one or more techniques of this disclosure, the computing device may synchronize operation of the sensor with operation of the display. For instance, the one or more sensors may emit the electromagnetic radiation at alternating times so as to cause alternating increases and decreases in luminance values of pixels. The alternating increases in decreases in luminance may visually cancel each other out, thereby minimizing visible effects of luminance value alteration.

In one example, various aspects of the techniques are directed to a computing device that includes a display comprising a plurality of pixels; one or more sensors positioned underneath the display and configured to emit electromagnetic radiation through the display during operation; and one or more processors configured to: program the pixels of the plurality of pixels during non-emission periods of frames of a plurality of frames based on image data of the frames; cause pixels of the plurality of pixels to emit light during emission periods of the frames, wherein an amount of light emitted by the pixels during an emission period of a particular frame is based on the programming for the particular frame; and synchronize operation of the one or more sensors and operation of the plurality of pixels by at least causing the one or more sensors to alternatingly emit the electromagnetic radiation during emission periods and non-emission periods.

In another example, various aspects of the techniques are directed to a method that includes programming, during non-emission periods of frames of a plurality of frames based on image data of the frames, pixels of the plurality of pixels of a display of a computing device; causing, during emission periods of the frames, pixels of the plurality of pixels to emit light, wherein an amount of light emitted by the pixels during an emission period of a particular frame is based on the programming for the particular frame; and synchronizing operation of one or more sensors and operation of the plurality of pixels by at least causing the one or more sensors to alternatingly emit, through the display, electromagnetic radiation during emission periods and non-emission periods.

The details of one or more examples of the subject matter of this specification are set forth in the accompanying drawings and the description below. Other features, aspects, and advantages of the subject matter will become apparent from the description, the drawings, and the claims.

DETAILED DESCRIPTION

Figures 1A, 1B:
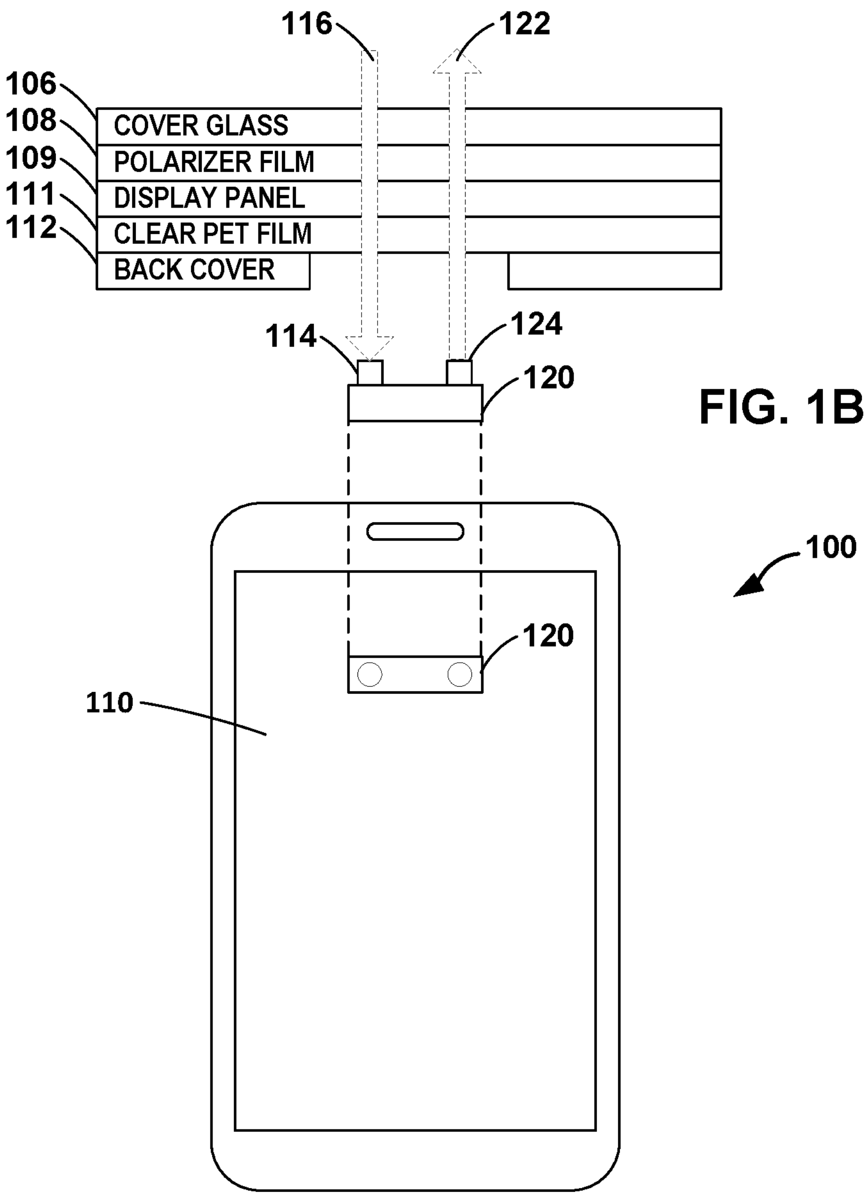
FIGS. 1A and 1B are diagrams illustrating an example computing device configured to perform various aspects of the image modification techniques described in this disclosure.

FIGS. 1A and 1B are diagrams illustrating an example computing device 100 configured to perform various aspects of the image modification techniques described in this disclosure. Computing device 100 may include a display 110 and an under-display sensor 120 ("UDS 120"). FIG. 1A illustrates a front perspective view of computing device 100. FIG. 1B illustrates an example cross section view of computing device 100.

Referring first to the example of FIG. 1A, computing device 100 may represent any type of computing device, such as a smart phone, a smart television, a smartwatch, smartglasses, a laptop computer, a handheld game console, a smart hub, a smart display, etc. Display 110 may include an array of light emitting pixels that form a display panel. In operation, display 110 may display an image by activating the light emitting pixels according to image data. Display 110 may be, for example, an active matrix organic light emitting diode (AMOLED) display or other type of OLED display, a light emitting diode (LED) display, and/or liquid crystal displays (LCD). Computing device 100 includes UDS 120 positioned under display 110 when considered from the front perspective as shown in the example of FIG. 1A.

Referring to FIG. 1B, a top layer of the cross section of computing device 100 includes display 110, which represents an arrangement of a cover glass 106, a polarizer film 108, a display panel 109, a clear PET film 111, and a back cover 112 (of display 110, not computing device 100). Polarizer film 108 is arranged under the cover glass 106. Display panel 109, representing an array of light emitting pixels, is arranged under the polarizer film 108, where clear PET film 111 (which represents a type of polyester film) is arranged under display panel 109. Back cover 112 is arranged under clear PET film 111.

UDS 120 is arranged at least partially under display 110. For example, UDS 120 may be located under the display panel 110, from the cross-sectional view of computing device 100. In some examples, UDS 120 may be coupled to a motherboard or other logic circuitry of computing device 100, while in other examples UDS 120 may be coupled to a back cover 112 of the display 110.

UDS 120 may include an emitter 124 and a receiver 114. In operation, emitter 124 emits and/or directs electromagnetic radiation, e.g., in the form of a transmitted pulse 122, through the pixel array forming, at least in part, display panel 109. Receiver 114 may receive a returning pulse 116 of electromagnetic energy through the pixel array forming, at least in part, display panel 109.

UDS 120 may represent, for example, an infrared (IR) sensor that emits and receives electromagnetic energy in the IR band of the electromagnetic spectrum. As such, UDS 120 may represent a near IR sensor or a short-wavelength IR sensor. Further, UDS 120 may, in some examples, represent a UV sensor, a LIDAR sensor, or a RADAR sensor. In some examples, UDS 120 may emit and receive electromagnetic energy in a range of bands of the electromagnetic spectrum. For instance, the electromagnetic radiation emitted by UDS 120 may include one or more of infrared radiation, ultraviolet radiation, or radiowave radiation. UDS 120 may, in some instances, represent more than one electromagnetic sensor 120.

When representative of an electromagnetic sensor, UDS 120 may facilitate, for example, remote and/or wireless control of a device, such as a television, cable box, sound system, gaming system, smart television, smartspeaker, smartwatch, smartglasses, etc. In these electromagnetic examples, UDS 120 may provide IR illumination. When used for IR illumination, UDS 120 may project IR radiation to an area, and receive the IR radiation reflected off objects in the area. In this way, UDS 120 may represent an electromagnetic sensor configured to emit and receive IR radiation in conjunction with a visible light camera to capture images of an area in dark lighting.

When representative of an electromagnetic sensor, UDS 120 emits electromagnetic radiation, e.g., an IR pulse, using emitter 124 configured to interfere with circuits within the pixel array of the display panel 109. IR interference can cause visual display artifacts to appear on display panel 109. As one example, IR interference may cause pixel glowing, resulting in a dot appearing on display panel 110 above UDS 120. The dot luminance intensity may be higher than a level at which it is programmed. As another example, IR interference may cause pixel dimming, resulting in a dot appearing on display panel 110 above UDS 120. The dot luminance intensity may be lower than a level at which it is programmed.

The size, shape, and intensity of the bright/dim dot may depend on characteristics of UDS 120. For example, a larger sized emitter 124 may produce more IR interference that results a larger sized dot to appear. In some examples, a smaller wavelength of electromagnetic radiation may cause additional interference and result in a different luminance intensity to be output by pixels adjacent or over UDS 120. UDS 120 may have varying effects on pixels within the pixel array of display panel 109. For example, pixels located in close proximity to the location of UDS 120 (e.g., directly over or adjacent to UDS 120) may experience greater interference than pixels that are further from UDS 120. In some examples, an emitter 124 with a wider field of view may produce larger dots due to alteration of more pixels within display panel 109.

As such, display 110 may allow one or more sensors to operate underneath display 110, in which the sensor signals and other external signals may pass-through various layers of the display 110 (which may be denoted as a "pass-through display 110"). To facilitate the pass-through nature of pass-through display 110 various back coverings on pass-through display 110 may be omitted during construction of pass-through display 110 at locations above and/or adjacent to a location of UDS 120 under pass-through display 110. That is, pass-through display 110 may include a back cover formed from foam (or other types of cushions) and copper (Cu) films that are removed in areas of back cover above 112 and/or adjacent to a location of UDS 120. The omission of back cover 112 allows the sensor signals and other external signals (e.g., light) to pass through display 110, where examples of such UDS 120 include ambient light sensors, cameras, fingerprint sensors, proximity sensors, or other types of optical sensors, electromagnetic sensors, etc.

In accordance with one or more techniques of this disclosure, computing device 100 may synchronize operation of display 110 with operation of UDS 120. As one example, UDS 120 may emit electromagnetic radiation at a point in operation of display 110 that minimizes an amount of time white dots resulting from the emission may be visible. For instance, as discussed in further detail below, UDS 120 may emit electromagnetic radiation just before pixels of display 110 above UDS 120 are programmed. As programming pixels of display 110 may undo any alteration caused by emission of electromagnetic radiation from UDS 120, emitting electromagnetic radiation just before programming may reduce an amount of time white dots resulting from the emission may be visible.

As another example, UDS 120 may emit electromagnetic radiation at points in operation of display 110 so as to cancel out the visual effects of dots resulting from the emission. As discussed in further detail below, depending on when UDS 120 emits electromagnetic radiation, the result may be a dim dot or a bright dot. Therefore, UDS 120 may emit electromagnetic ration at alternate emission points in synchronization with operation of display 110 to alternatingly cause dim dots and bright dots. The alternating dim dots and bright dots may visually cancel out, thereby reducing the effects of emission by UDS 120.

Figure 2:
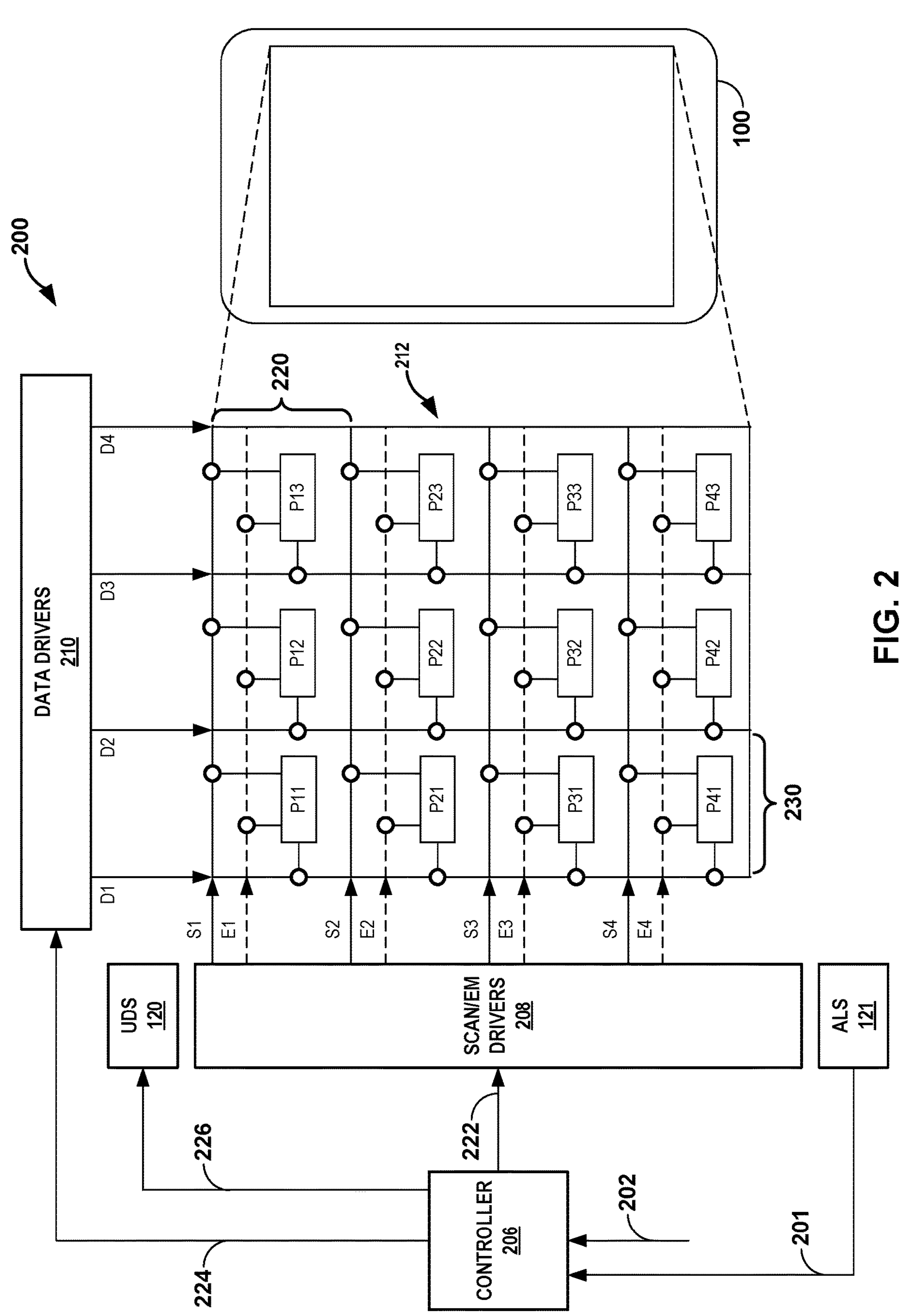
FIG. 2 is a diagram illustrating, in more detail, the computing device shown in the example of FIGS. 1A and 1B when configured to perform various aspects of the image modification techniques described in this disclosure.

FIG. 2 is a diagram illustrating, in more detail, the computing device shown in the example of FIGS. 1A and 1B when configured to perform various aspects of the image modification techniques described in this disclosure. As shown in the example of FIG. 2, display 200 may represent an example of display 110, where display 200 represents an OLED display system that includes an array 212 of light emitting pixels. Each light emitting pixel includes an OLED.

Drivers, including SCAN/EM drivers 208 and data drivers 210, may drive OLED display 200. SCAN/EM drivers 208 may be integrated, i.e., stacked, row line drivers. In some examples, SCAN/EM drivers 208 identifies a row of pixels in the display, and data drivers 210 provide data signals (e.g. voltage data) to the pixels in the selected row to cause the OLEDs to output light according to image data. Signal lines such as scan lines, EM lines, and data lines may be used in controlling the pixels to display images on the display. Though FIG. 2 illustrates OLED display 200 as having SCAN/EM drivers 208 on one side, SCAN/EM drivers 208 may be arranged on both left and right sides of OLED display 200 improving the driving performance (e.g. speed), compared to when such drivers are placed on only the left side or only the right side of OLED display 200.

OLED display 200 includes pixel array 212 that includes a plurality of light emitting pixels, e.g., the pixels P11 through P43. A pixel is a small element on a display that can change color based on the image data supplied to the pixel. Each pixel within pixel array 212 can be addressed separately to produce various intensities of color. Pixel array 212 extends in a plane and includes rows and columns.

Each row extends horizontally across pixel array 212. For example, a first row 220 of the pixel array 212 includes pixels P11, P12, and P13. Each column extends vertically down the pixel array 212. For example, first column 230 of the pixel array 212 includes pixels P11, P21, P31, and P41. Only a subset of the pixels are shown in FIG. 2 for ease of illustration purposes and OLED display 200 may include hundreds, thousands, or millions of pixels (and possibly more in high resolution displays). In practice, there may be several million pixels in the pixel array 212. Greater numbers of pixels can result in higher resolution.

OLED display 200 includes SCAN/EM drivers 208 and data drivers 210. SCAN/EM drivers supply SCAN and EM signals to rows of pixel array 212. SCAN/EM drivers 208 supply, in the example of FIG. 2, scan signals via scan lines S1 to S4, and EM signals via EM lines E1 to E4, to respective rows of pixels. Data drivers 210 supply signals to columns of pixel array 212. In the example of FIG. 2, data drivers 210 supply data signals, via data lines D1 to D4, to the columns of pixels.

Each pixel in the pixel array 212 is addressable by a horizontal scan line and EM line, and a vertical data line. For example, pixel P11 is addressable by scan line S1, EM line E1, and data line D1. In another example, pixel P32 is addressable by scan line S3, EM line E3, and data line D2.

SCAN/EM drivers 208 and data drivers 210 provide signals to the pixels enabling the pixels to reproduce the image. SCAN/EM drivers 208 and data drivers 210 provide the signals to the pixels via the scan lines, the emission lines, and the data lines. To provide the signals to the pixels, SCAN/EM drivers 208 select a scan line and control the emission operation of the pixels. Data drivers 210 provides data signals to pixels addressable by the selected scan line to light the selected OLEDs according to the image data.

The scan lines are addressed sequentially for each frame. A frame is a single image in a sequence of images that are displayed. A scan direction determines the order in which the scan lines are addressed. In OLED display 200, the scan direction is from top to bottom of the pixel array 212. For example, scan line S1 is addressed first, followed by the scan lines S2, then S3, etc.

OLED display 200 includes a controller 206 that receives display input data 202. Controller 206 generates scan control signals 222 and data control signals 224 from display input data 202. Scan control signals 222 may drive SCAN/EM drivers 208. Data control signals 224 may drive the data drivers 210. Controller 206 controls the timing of the scan signals and EM signals through scan control signals 222. Controller 206 controls the timing of the data signals through the data control signals 224.

Controller 206 can also control the timing of UDS 120. Controller 206 can control the timing of UDS 120 through sensor control signals 226, which may also be referred to a synchronization signals. Sensor control signals 226 may include start and stop signals. Controller 206 may send a start signal to UDS 120 to allow UDS 120 to emit electromagnetic radiation, e.g., an IR pulse. Controller 206 may send a stop signal to UDS 120 to cause UDS 120 to cease emitting electromagnetic radiation, or to prevent UDS 120 from emitting electromagnetic radiation.

Controller 206 may synchronize scan control signals 222, data control signals 224, and sensor control signals 226 to reduce interference between UDS 120 emissions and pixel light emissions. For example, controller 206 may synchronize sensor control signals 226 with scan control signals 222 to prevent UDS 120 from emitting electromagnetic energy during an EM signal pulse for pixel rows located near to UDS 120. Controller 206 may also synchronize sensor control signals 226 with scan control signals 222 to prevent UDS 120 from emitting electromagnetic radiation during a scan period for pixel rows located near to UDS 120.

Figure 3:
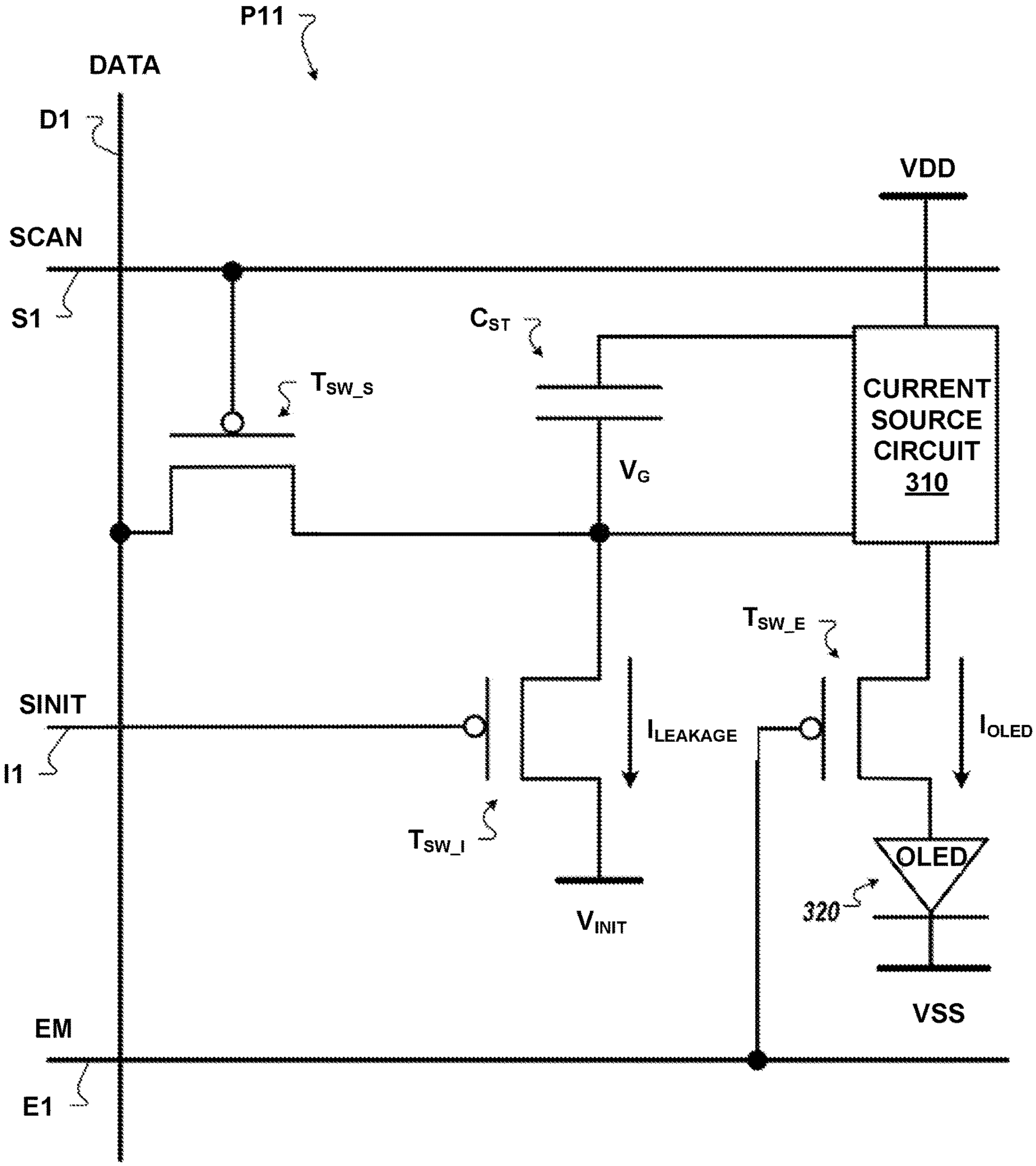
FIG. 3 is a diagram illustrating, in more detail, an example pixel circuit of a display system included in the computing device shown in the example of FIG. 2.

FIG. 3 is a diagram illustrating, in more detail, an example pixel circuit of a of an example pixel circuit of a display system included in the computing device shown in the example of FIG. 2. In the example of FIG. 3, pixel P11 of the display system 200 (discussed above with respect to the example of FIG. 2) is shown in more detail. Pixel P11 represents an active matrix OLED (AMOLED) pixel. The pixel P11 is addressable by horizontal scan line S1, emission line E1, vertical data line D1, and initializing signal line I1. Pixel P11 receives a scan signal "SCAN" from scan line S1, a data voltage "DATA" from data line D1, and an emission signal "EM" from emission line E1. Pixel P11 also receives an initializing signal "SINIT" from an initial signal line I1. Pixel P11 receives power supply voltage VDD and an initial reference voltage VINIT. Pixel P11 is connected to a common ground VSS.

Pixel P11 includes an organic light-emitting diode (OLED) 320. OLED 320 includes a layer of an organic compound that emits light in response to an electric current, $I_{OLED}$. The organic layer is positioned between two electrodes: an anode and a cathode. Current source circuit 310 receives the supply voltage VDD and drives OLED 320 to emit light.

Pixel P11 includes a storage capacitor $C_{ST}$. Storage capacitor $C_{ST}$ may maintain the gate voltage $V_G$ during illumination of pixel P11.

Pixel P11 also includes multiple p-channel switching thin film transistors (TFTs). The switching TFTs include a signal TFT ($T_{SW\_S}$), an initializing TFT ($T_{SW\_I}$), and an emission TFT ($T_{SW\_E}$). In some examples, the switching TFTs can be n-channel transistors with the opposite polarity control signals.

During operation, switching TFT $T_{SW\_S}$ starts and stops the charging of the storage capacitor $C_{ST}$ based on receiving the SCAN signal from scan line S1. During an addressing period, scan line S1 turns on switching TFT $T_{SW\_S}$. Switching TFT $T_{SW\_S}$ provides the data voltage DATA from data line D1 to storage capacitor $C_{ST}$ and current source circuit 310.

Pixel P11 is programmed by the control signals: SCAN, SINIT, EM, and DATA. The OLED current, $I_{OLED}$, varies by the gate voltage $V_G$. When the gate voltage $V_G$ is steady, pixel P11 maintains a steady luminance throughout a frame time, displaying light corresponding to the supplied image data as programmed. A frame time, or frame period, is the amount of time between a start of a frame and a start of a next frame. The frame time can be the inverse of a frame rate of a display system. For example, a frame rate of 60 frames per second (fps) corresponds to a frame time of 1/60 seconds, or 0.0167 seconds.

When current source circuit 310 receives the data voltage DATA through switching TFT $T_{SW\_S}$, the current source circuit 310 provides a specified current $I_{OLED}$ to the OLED 320 based on the received data voltage DATA, such that OLED 320 emits light in accordance with the electric current $I_{OLED}$. The intensity or brightness of the emitted light depends on the amount of electrical current $I_{OLED}$ applied. A higher current can result in brighter light compared to a lower current, which results in a lower relative brightness. Thus, the intensity of the light emitted from OLED 320 is based on the data voltage DATA that corresponds to image data for the individual pixel. The storage capacitor $C_{ST}$ maintains the pixel state (e.g., stores the gate voltage level $V_G$) such that pixel P11 remains illuminated continuously after the addressing period.

Exposure to electromagnetic radiation may cause a leakage current $I_{leakage}$ to flow from storage capacitor $C_{ST}$ through TFT $T_{SW\_I}$. Leakage current $I_{leakage}$ may affect the OLED current IDLED, causing changes to the illumination level of the pixel P11.

Although FIG. 2 and FIG. 3 illustrate example components of an OLED display, the described techniques may be applied to any panel display that includes an array of pixels. For example, the process for reducing artifacts due to electromagnetic radiation may be applied to light emitting diode (LED) panels, liquid crystal displays (LCD), and plasma display panels (PDP).

Figure 4:
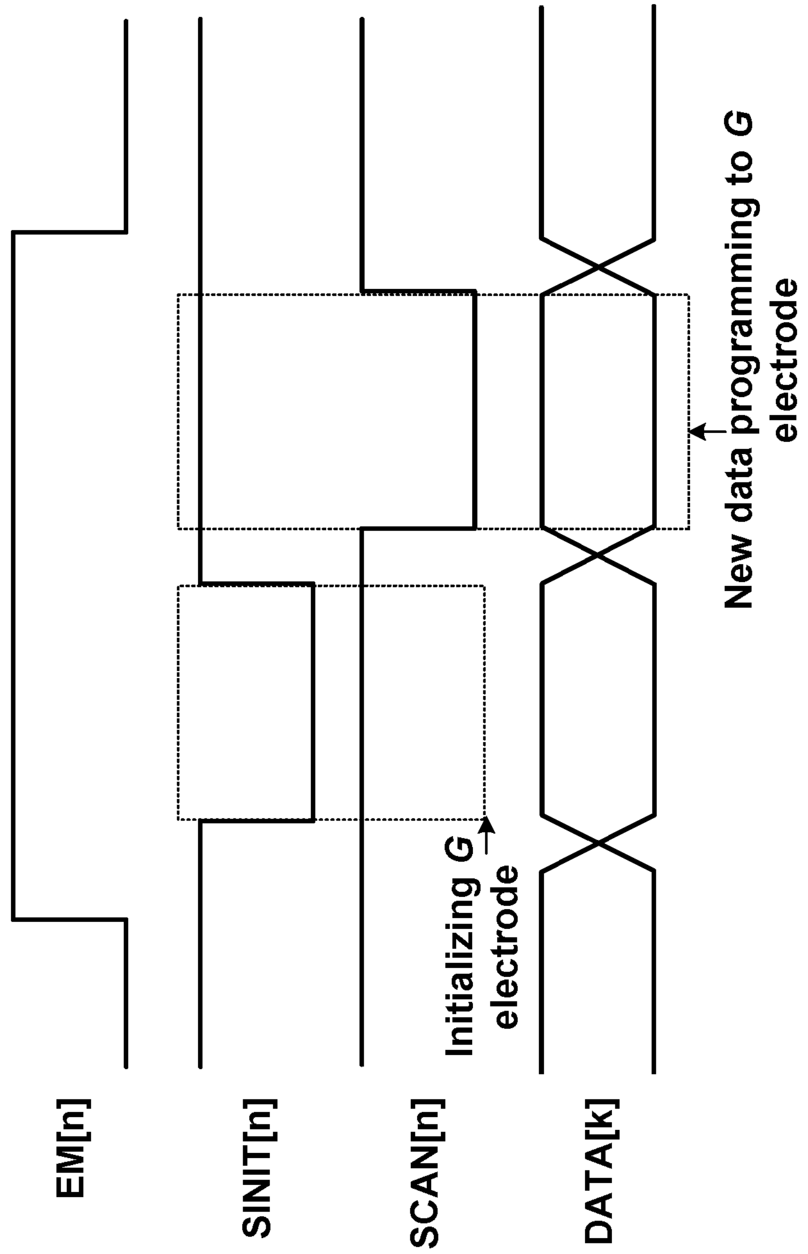
FIG. 4 is a conceptual diagram illustrating various signals of a display of a device.

FIG. 4 is a conceptual diagram illustrating various signals of a display of a device. The signals EM[n], SINIT[n], SCAN[n], and DATA[k] of FIG. 4 may correspond to signals EM, SINIT, SCAN, and DATA from FIG. 3 for kth pixel of an nth row of pixels of a display, such as display 110. As shown in FIG. 4, during a non-emission period (e.g., when EM[n] is high), a controller (e.g., one or more processors that generate the signals EM[n], SINIT[n], SCAN[n], and DATA[k], such as controller 206 of FIG. 2) may initialize the gate voltage level $V_G$ (e.g., erased, brought to VINO by outputting SINIT[n] as low (e.g., where $T_{SW\_I}$ is a p-channel switch, the controller may output SINIT[n] as high to initialize the gate voltage level where $T_{SW\_I}$ is an n-channel switch) so as to open switch $T_{SW\_I}$. Following initialization, the controller may program the gate voltage level $V_G$ by opening switch $T_{SW\_S}$ by outputting SCAN[n] as low. In this way, the controller may cause a circuit to store a voltage level that represents an emissive intensity of a particular pixel. When the controller output EM[n] as low, the display may operate in an emission period in which an emitting element (e.g., 320 of FIG. 3) emits electromagnetic radiation (e.g. visible light) with an intensity based on the gate voltage level $V_G$.

Figure 5:
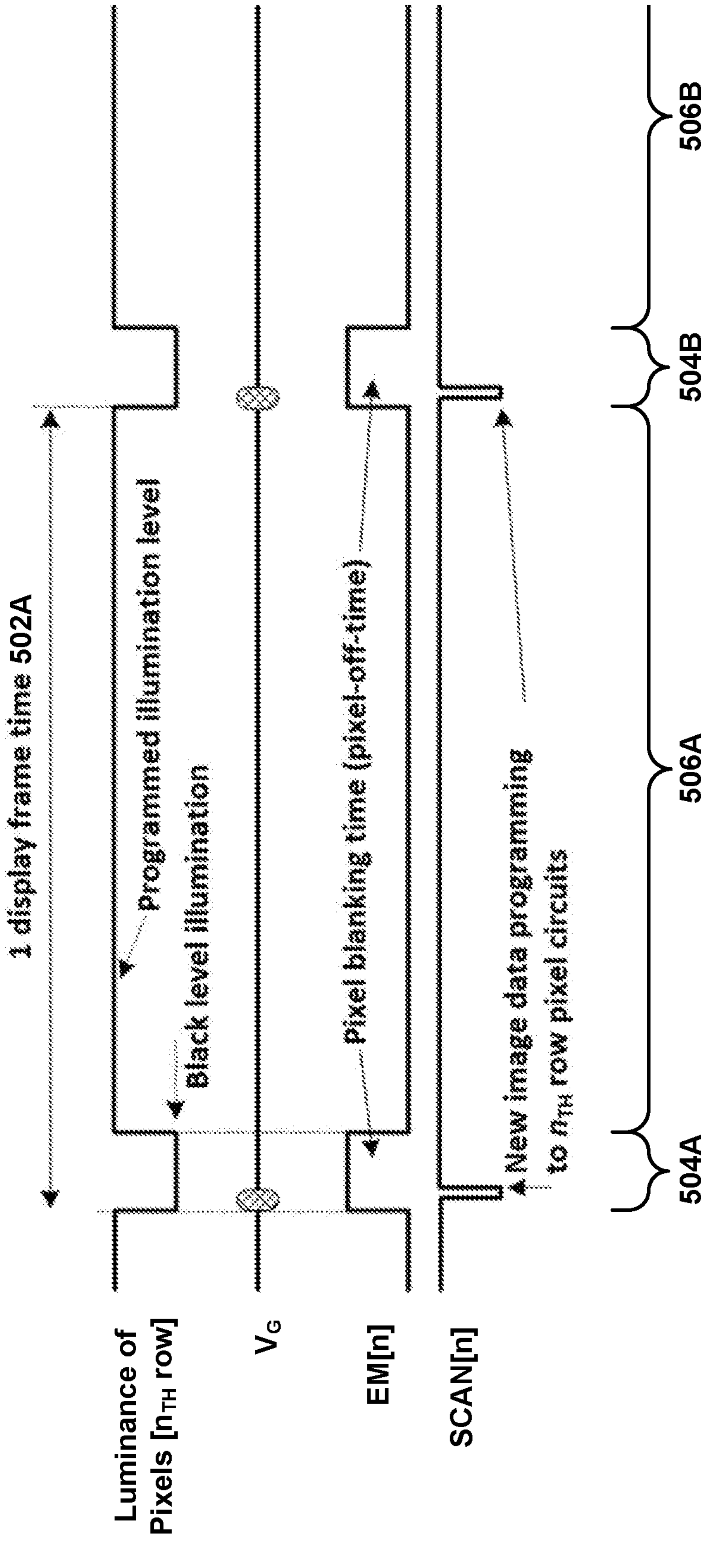
FIG. 5 is a conceptual diagram illustrating various signals of a display of a device.

FIG. 5 is a conceptual diagram illustrating various signals of a display of a device. The signals of FIG. 5 may represent the signals of a display of a computing device, such as display 110 of computing device 100 of FIG. 1A. As shown in FIG. 5, operation of the display may be divided into non-emission periods 504A and 504B (collectively, "non-emission periods 504") and emission periods 506A and 506B (collectively, "emission periods 506"). As discussed above (e.g., with reference to FIG. 4), controller 206 may program gate voltage levels of pixels during non-emission periods 504 and may cause emitting elements to emit electromagnetic radiation with intensities based on their respective gate voltage levels during emission periods 506. For instance, during emission period 506A, the emitting elements may emit electromagnetic radiation at an intensity programmed during non-emission period 504A (e.g., programmed illumination level). Similarly, during emission period 506B, the emitting elements may emit electromagnetic radiation at an intensity programmed during non-emission period 504B. Non-emission periods 504 may be referred to as pixel blanking time/pixel off time. Each frame of image data may include a respective non-emission period during which the pixels are programmed, and an emission period during which the pixels emit an amount of light based on the programming.

Figure 6:
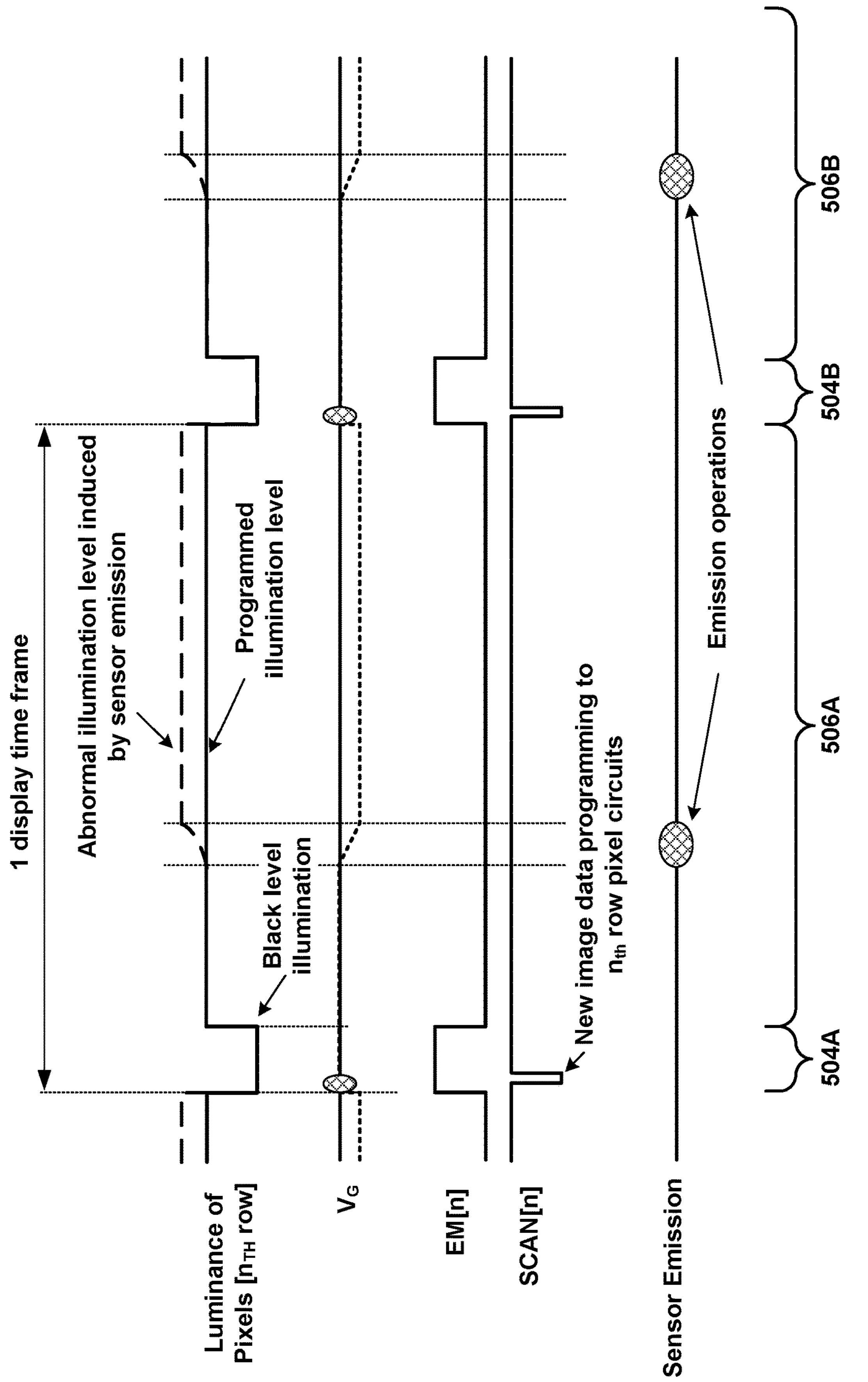
FIG. 6 is a conceptual diagram illustrating various signals of a display of a device.

FIG. 6 is a conceptual diagram illustrating various signals of a display of a device. FIG. 6 may correspond to FIG. 5 with the addition of sensor emission and resulting alteration of luminance level. As shown in FIG. 6, when a sensor, such as UDS 120, emits electromagnetic radiation during an emission period of emission periods 506, the luminance level of one or more pixels above the sensor may be altered for the remainder of the emission period. For example, as discussed above, electromagnetic emissions by the sensor may at least partially open switch $T_{SW\_I}$, which may result in an increase in leakage current (e.g., $I_{leakage}$ of FIG. 3). This leakage current may result in a lowering of gate voltage stored in capacitor $C_{ST}$, which in turn may result in an increase in current $I_{OLED}$ (e.g., where current source circuit 310 of FIG. 3 is p-channel). This increased current $I_{OLED}$ may result in an increase in the luminance value of the emitting element (e.g., OLED 320). In this way, the emission of the electromagnetic radiation by the one or more sensors may modify the stored voltage level.

Figure 7:
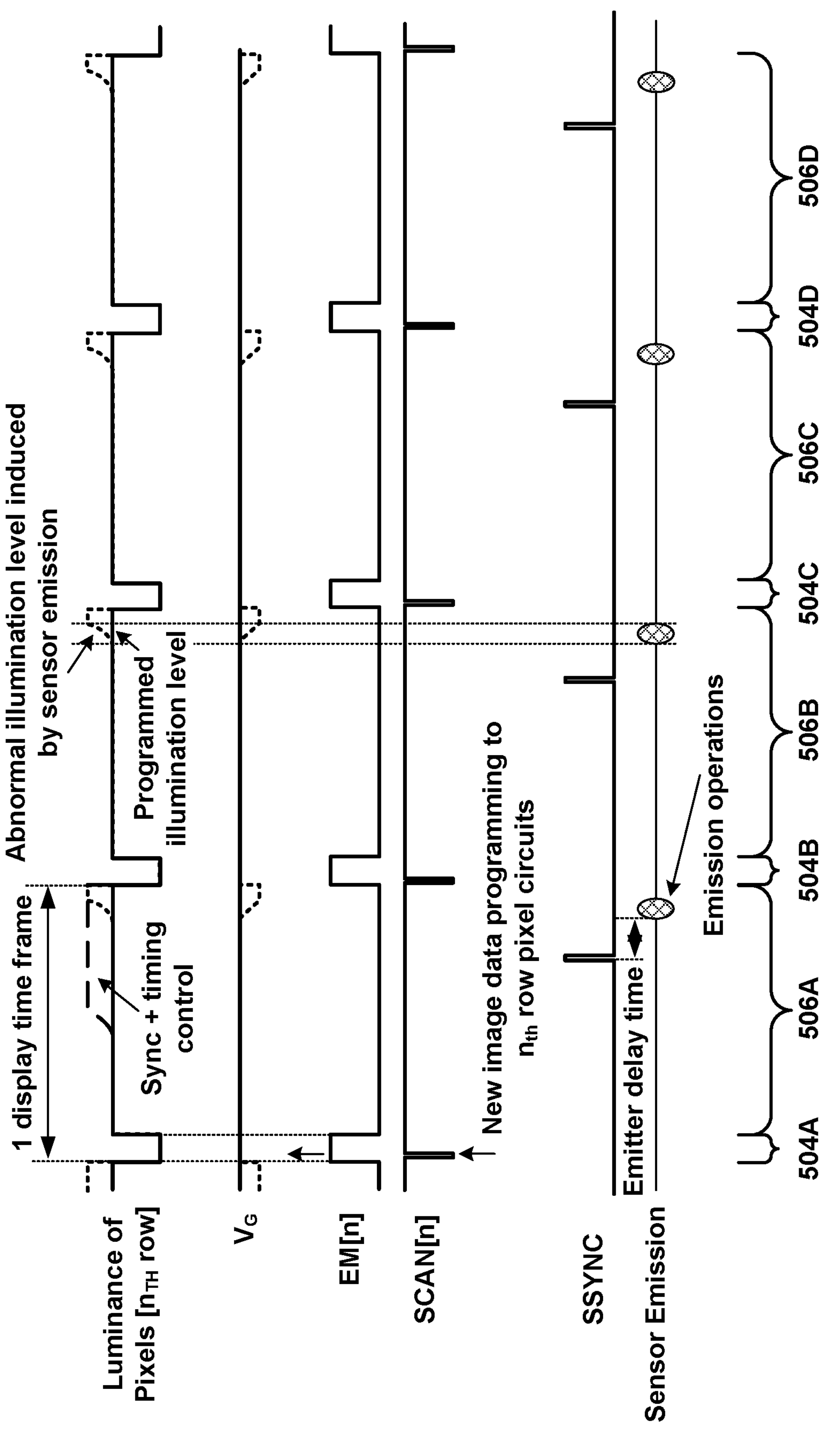
FIG. 7 is a conceptual diagram illustrating various signals of a display of a device with synchronized operation of under display electromagnetic emission, in accordance with one or more techniques of this disclosure.

In accordance with one or more techniques of this disclosure, a controller (e.g., controller 206) may synchronize operation of a display and sensors under the display to minimize the visual appearance of sensor emission induced luminance alteration. For instance, the controller may cause the one or more sensors to emit the electromagnetic radiation during a particular portion of the emission period of the frame. As one example, to cause the one or more sensors to emit the electromagnetic radiation during the particular portion of the emission period, the controller may cause the one or more sensors to emit the electromagnetic radiation near an end of the emission period. FIG. 7 is a conceptual diagram illustrating various signals of a display of a device with synchronized operation of under display electromagnetic emission, in accordance with one or more techniques of this disclosure. As shown in FIG. 7, by causing the one or more sensors to emit the electromagnetic radiation near an end of the emission period, the controller may reduce the amount of time that the emissive elements (e.g., OLEDs) emit light at altered luminance levels.

In some examples, to cause the one or more sensors to emit the electromagnetic radiation near the end of the emission period, the controller may one or both of cause the one or more sensors to emit the electromagnetic radiation during a final sub-portion of the emission period; and refrain from causing the one or more sensors to emit the electromagnetic radiation during portions of the emission period other than the final sub-period of the emission period. In some examples, the final sub-portion may be defined as a last percentage of the total time of the emission period. For instance, the final sub-portion may be a last 1%, 5%, 10%, 20%, 30%, 40% of the emission period. In some examples, the final sub-portion may be defined as a temporal offset from an end of the emission period. For instance, the final sub-portion may begin 1 millisecond (ms), 2 ms, 5 ms, 10 ms, 50 ms from an end of the emission period and conclude at the end of the emission period.

In some examples, to cause the one or more sensors to emit the electromagnetic radiation near the end of the emission period, the controller may one or both of cause the one or more sensors to emit the electromagnetic radiation after a predetermined delay period; and refrain from causing the one or more sensors to emit the electromagnetic radiation prior to an expiration of the predetermined delay period. The predetermined delay period may be an amount of time from a particular point in the frame. For instance, the predetermined delay period may be an amount of time from a start of the emission period, an amount of time from a start of a non-emission period that preceded the emission period, or another other feature of signals.

Figure 8:
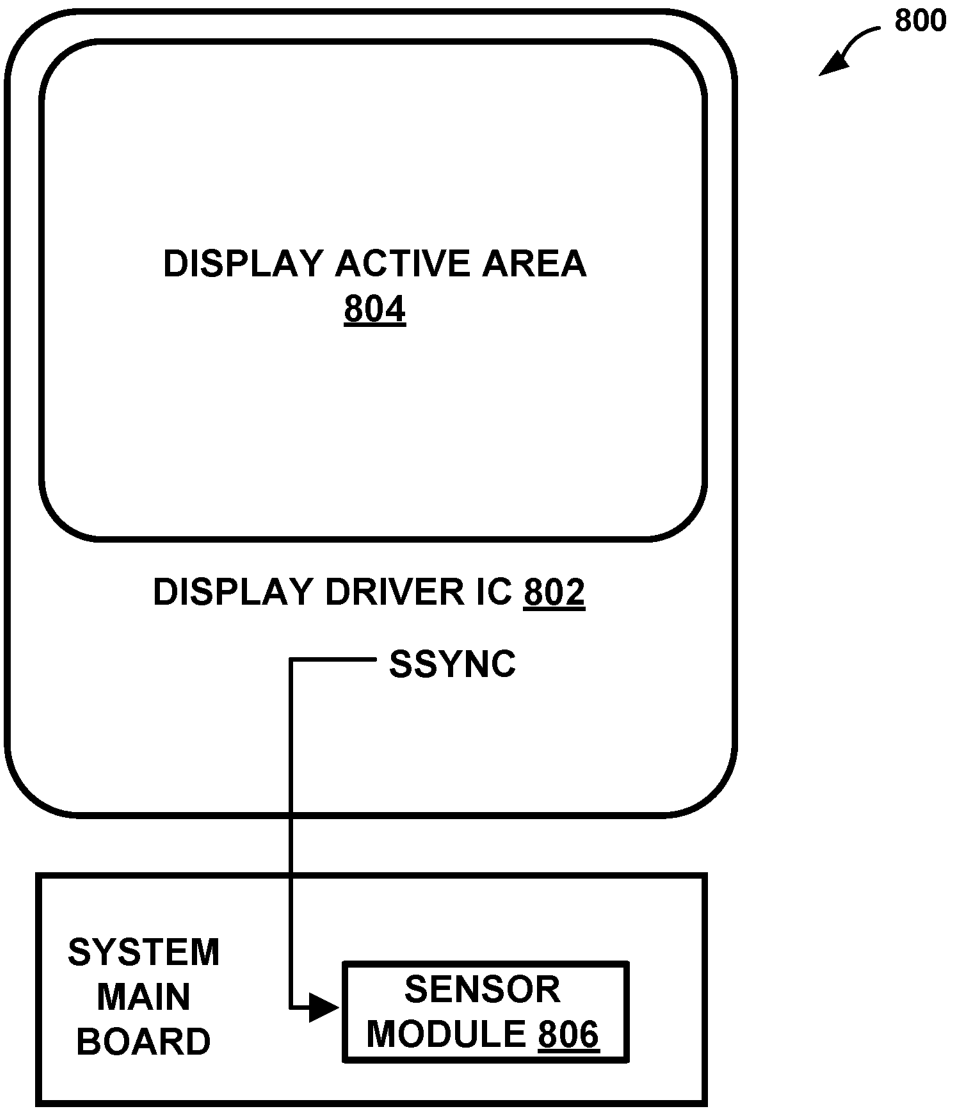
FIG. 8 is a block diagram illustrating component of a device that synchronizes operation of under display electromagnetic emission with display operation, in accordance with one or more techniques of this disclosure.

FIG. 8 is a block diagram illustrating component of a device that synchronizes operation of under display electromagnetic emission with display operation, in accordance with one or more techniques of this disclosure. As discussed above, one or more processors of a device (e.g., controller 206) may synchronize operation of a display with operation of a sensor under the display. In some examples, the one or more processors may achieve the synchronization by outputting a signal to the sensors and/or display that causes some operation. For instance, where the one or more processors include a display driver integrated circuit (IC), such as display driver IC 802 of FIG. 8, the one or more processors may output a synchronization signal (e.g., SSYNC of FIG. 8) to the one or more sensors (e.g., sensor module 806 of FIG. 8) that causes the one or more sensors to emit electromagnetic radiation. Display driver IC 802 may be an example of controller 206 of FIG. 2. As shown in FIG. 8, the sensors (e.g., sensor module 806) may located on a main system board. In such examples, display driver IC 802 may provide the synchronization signal using any electrical connection to sensor module 806.

Figure 9:
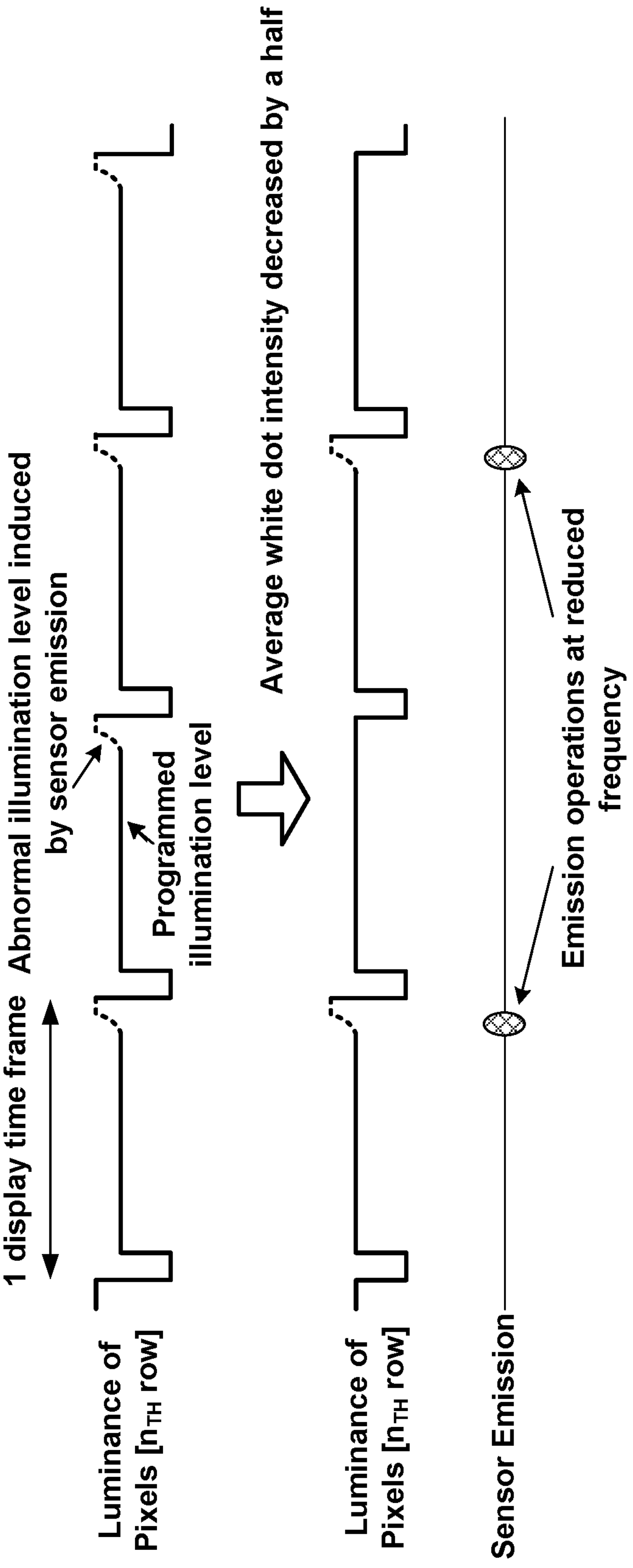
FIG. 9 is a conceptual diagram illustrating various signals of a display of a device with synchronized operation of under display electromagnetic emission, in accordance with one or more techniques of this disclosure.

FIG. 9 is a conceptual diagram illustrating various signals of a display of a device with synchronized operation of under display electromagnetic emission, in accordance with one or more techniques of this disclosure. As discussed above, one or more processors of a device may synchronize operation of a display with operation of a sensor under the display by at least causing the sensor to emit the electromagnetic radiation during a particular portion of an emission period of the display. In accordance with one or more techniques of this disclosure, in addition to or in place of causing the sensor to emit the electromagnetic radiation during the particular portion of the emission period of the display, the one or more processors may operate the one or more sensors at a sensor operation frequency that is less than a display frame frequency. For instance, the one or more processors may cause the one or more sensors to emit the electromagnetic radiation during a first sub-set of frames of the plurality of frames; and refrain from causing the one or more sensors to emit the electromagnetic radiation during a second sub-set of frames of the plurality of frames. As such, in some examples, the one or more sensors may not emit electromagnetic radiation during emission periods of consecutive frames. As one specific example, the sensor frequency may be one-half of the display frame frequency (e.g., where the display frame frequency is 60 Hz, the sensor frequency may be 30 Hz) such that the first sub-set of frames includes one of even frames or odd frames and the second sub-set of frames includes the other of even frames or odd frames. Other fractions are possible, such as one-third, one-fourth, . . . etc. In this way, instead of emitting electromagnetic radiation every frame, the one or more sensors may emit once every 'n' display frames, where 'n' can be 2, 3, . . . , 12 etc. frames. By operating the one or more sensors at a sensor operation frequency that is less than a display frame frequency, the one or more processors may reduce a visual appearance of any dots created as a result of the sensor operation. For instance, by using a sensor operation frequency that is half of the display frame frequency, the one or more processors may cut the visual appearance of white dots in half (e.g., average white dot intensity decreased by a half).

While reducing the sensor operation frequency relative to the display frame frequency may provide advantages, these advantages may be reduced when the sensor operation frequency drops too low. For instance, if the sensor operation frequency is 1 Hz, the resulting bright dot may appear to blink, which may be more distracting than a brighter but static dot. As such, in accordance with one or more techniques of this disclosure, the one or more processors may refrain from using sensor operation frequencies below a threshold (e.g., 4 Hz).

Figures 10A, 10B, 10C:
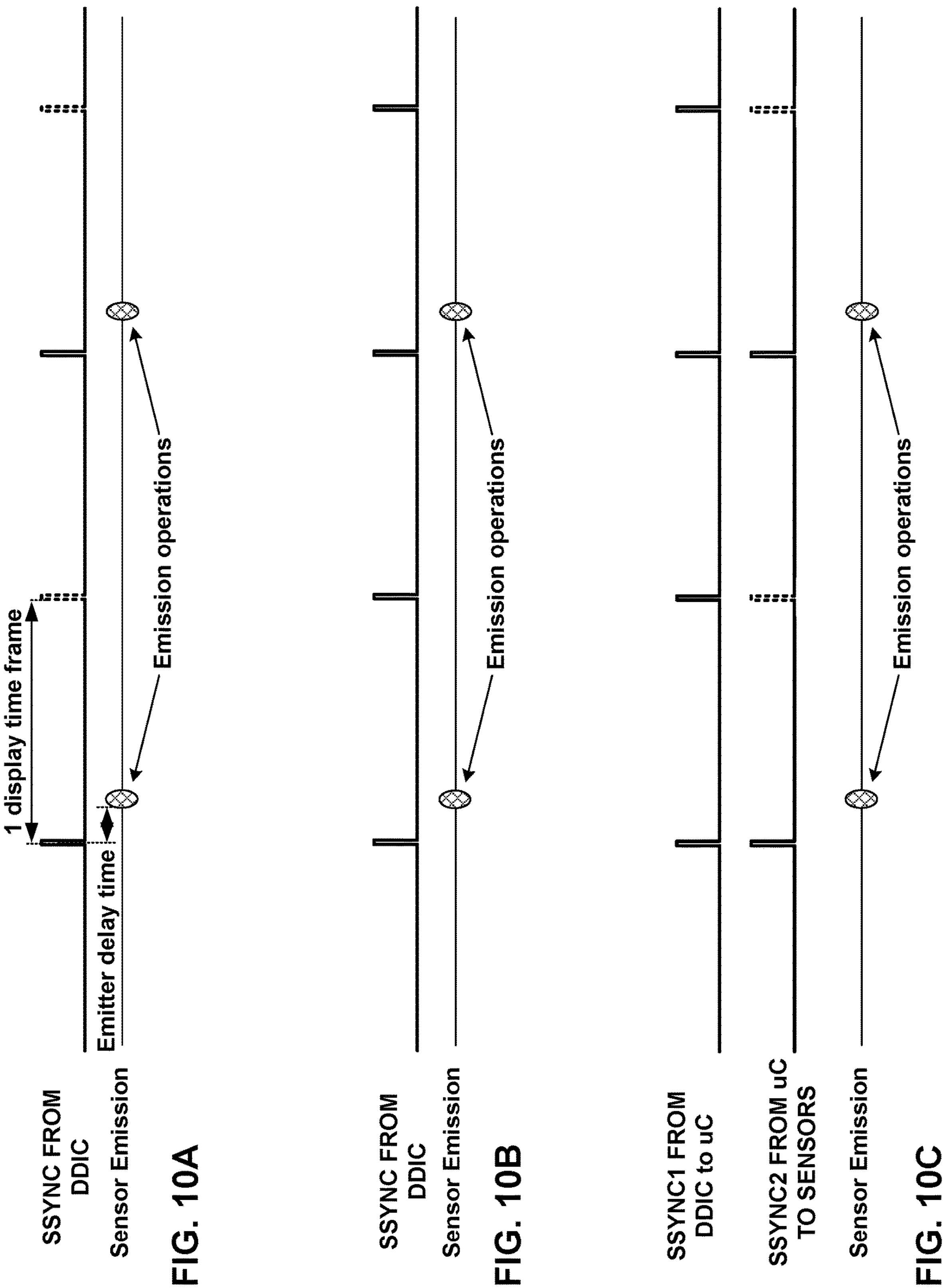
FIGS. 10A-10C are conceptual diagrams illustrating signals of a device for synchronized operation of under display electromagnetic emission, in accordance with one or more techniques of this disclosure.

FIGS. 10A-10C are conceptual diagrams illustrating signals of a device for synchronized operation of under display electromagnetic emission, in accordance with one or more techniques of this disclosure. Each of FIGS. 10A-10C illustrates a different example of how one or more processors may synchronize operation of a display and a sensor that emits light through the display. As shown in FIGS. 10A-10C, a controller, such as display driver IC 802 of FIG. 8, may output a synchronization signal that includes pluses that cause one or more sensors to emit electromagnetic radiation. The one or more sensors may not immediately emit the electromagnetic radiation upon the controller outputting a synchronization pulse. Instead, in some examples, the one or more sensors may emit the electromagnetic radiation after an emitter delay time from the synchronization pulse. The controller may be programmed with this emitter delay time, referred to below as $T_{DP}$, and may account for the delay time when outputting synchronization pulses.

As discussed above, one or more processors may synchronize a sensor with a display using a sensor operation frequency that is less than a display frame frequency. FIGS. 10A-10C illustrate examples where the sensor operation frequency is one half of the display frame frequency, though, as discussed above, other ratios are possible. In the example of FIG. 10A, the one or more processors may achieve a sensor operation frequency that is one half of the display frame frequency by outputting a synchronization pulse every other frame. In the example of FIG. 10B, the one or more processors may achieve a sensor operation frequency that is one half of the display frame frequency by outputting a synchronization pulse every frame, and the sensor may count the synchronization pulses and emit every X pulses (e.g., emit every two pulses for a sensor operation frequency that is one half of the display frame frequency). In the example of FIG. 10C, a second controller, such as a low power microcontroller (uC), may be positioned between the first controller that outputs the synchronization pulses (e.g., DDIC 802) and the sensor. The second controller may receive the first synchronization pulses (SSYNC1) from the first controller (e.g., at the display frame frequency), and output second synchronization pulses (SSYNC2) to the sensor (e.g., at the sensor operation frequency).

Figure 11:
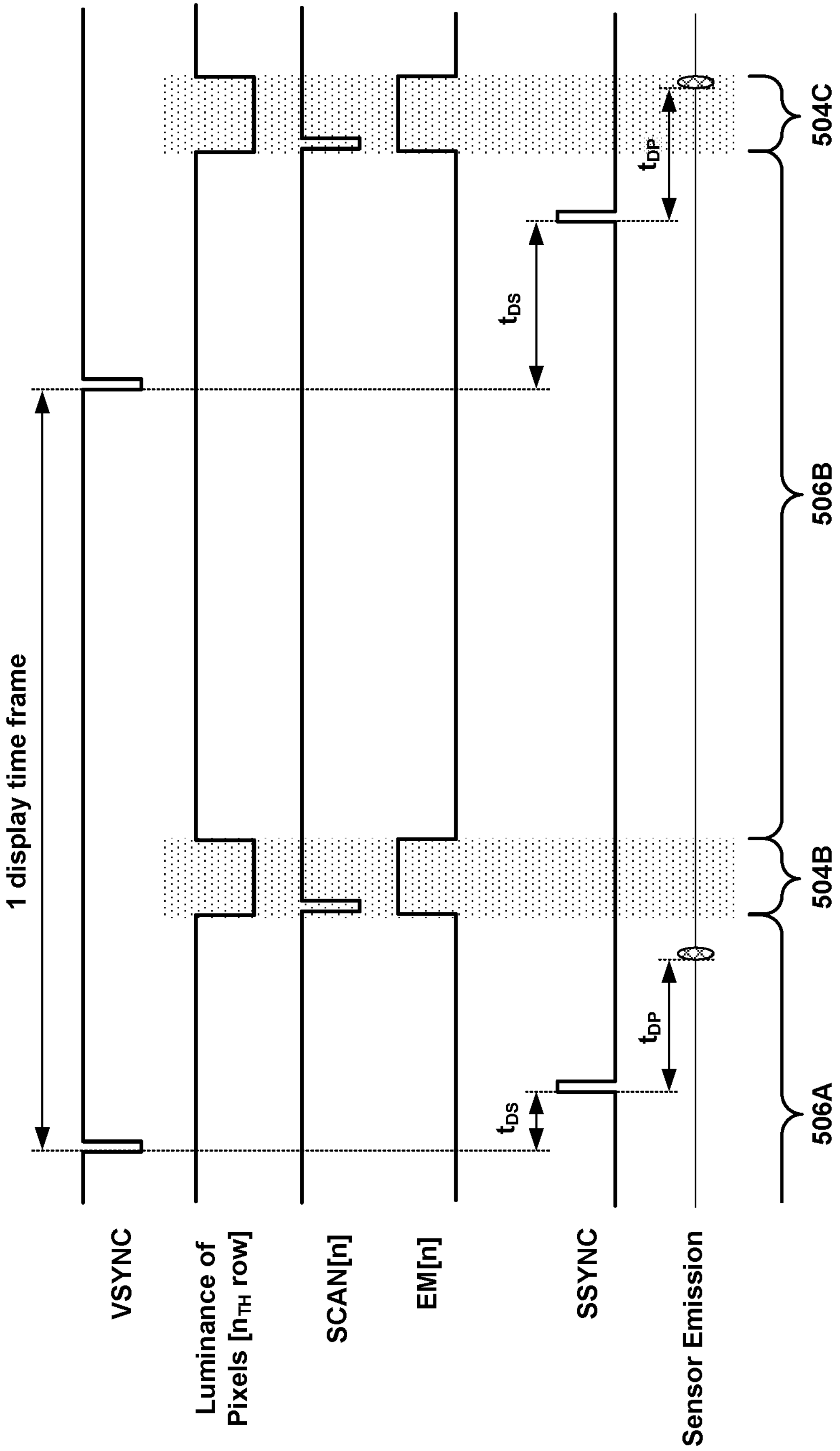
FIG. 11 is a conceptual diagram illustrating various signals of a display of a device with synchronized operation of under display electromagnetic emission, in accordance with one or more techniques of this disclosure.

FIG. 11 is a conceptual diagram illustrating various signals of a display of a device with synchronized operation of under display electromagnetic emission, in accordance with one or more techniques of this disclosure. As discussed above, depending on when a sensor (e.g., UDS 120) emits electromagnetic radiation, pixels above the sensor may appear as a dim dot or a bright dot. For instance, emission of electromagnetic radiation during an emission period of the pixels may cause the pixels to appear as a bright dot. Alternatively, emission of electromagnetic radiation during a non-emission period of the pixels may cause the pixels to appear as a dim dot.

In accordance with one or more techniques of this disclosure, a controller of a device may synchronize operation of a sensor with operation of a display by at least causing the sensor to alternatingly emit the electromagnetic radiation during emission periods and non-emission periods. By alternating emission of electromagnetic radiation by the sensors between emission periods and non-emission periods of the pixels, the controller may cause alternating dim and bright dots (e.g., alternating increases and decreased in luminance). The alternating dim and bright dots may visually cancel each other out, thereby minimizing visible effects of sensor operation.

In some examples, to cause the one or more sensors to alternatingly emit the electromagnetic radiation during emission periods and non-emission periods, the controller may cause the one or more sensors to emit the electromagnetic radiation during an emission period of a frame of the plurality of frames; and refrain from causing the one or more sensors to emit the electromagnetic radiation during an emission period of a subsequent frame of the plurality of frames until after causing the one or more sensors to emit the electromagnetic radiation during a non-emission period. As such, is some examples, the sensors may not emit electromagnetic radiation during two emission periods without also emitting electromagnetic radiation during an intervening non-emission period.

Figure 12:
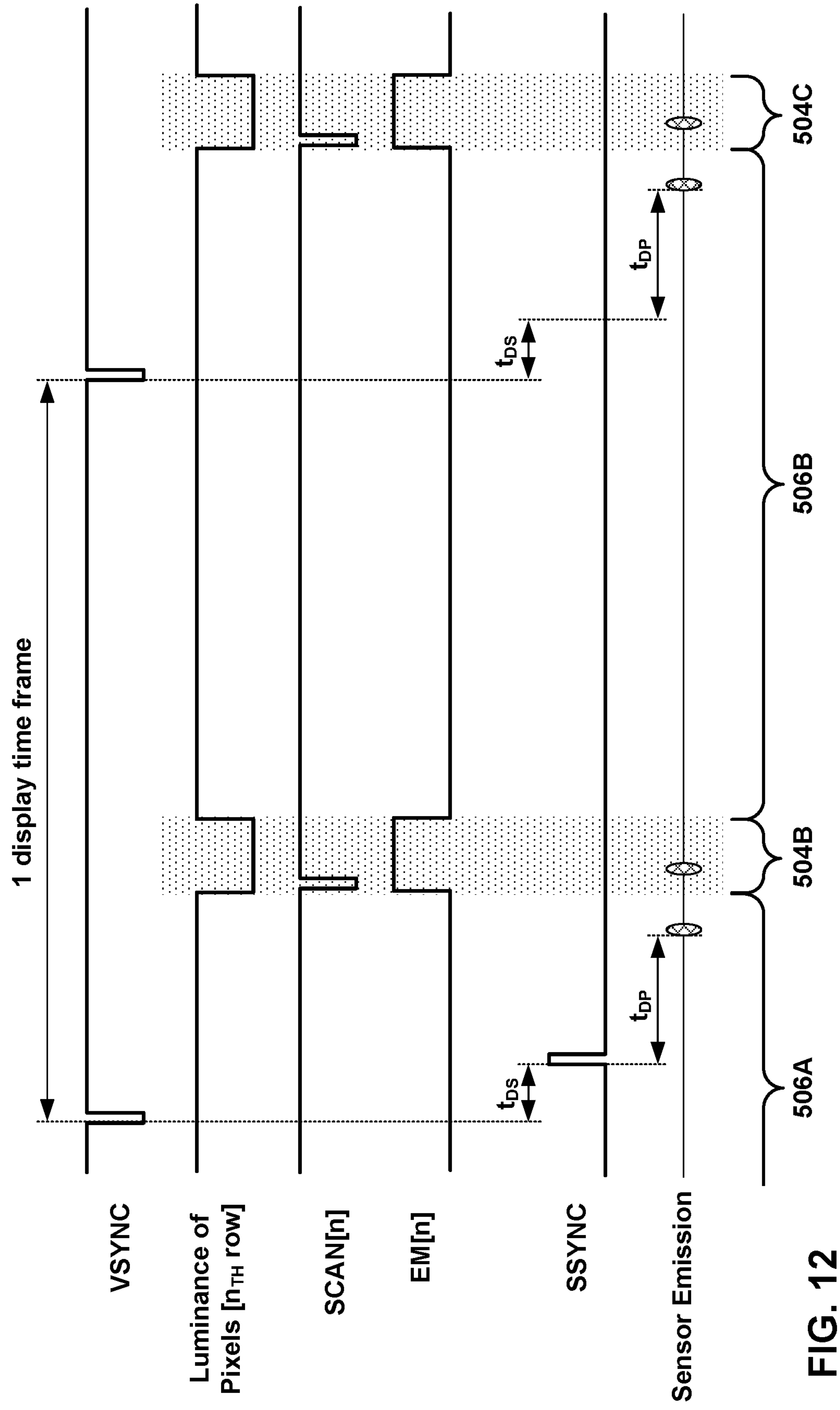
FIG. 12 is a conceptual diagram illustrating various signals of a display of a device with synchronized operation of under display electromagnetic emission, in accordance with one or more techniques of this disclosure.

In some examples, to cause the one or more sensors to alternatingly emit the electromagnetic radiation during emission periods and non-emission periods, the controller may cause the one or more sensors to emit the electromagnetic radiation during a particular emission period; and cause the one or more sensors to emit the electromagnetic radiation during a non-emission period temporally adjacent to the particular emission period. In some examples, the particular emission period and the non-emission period temporally adjacent to the particular emission period may be in a same frame. For instance, as shown in FIG. 12, the particular emission period may be emission period 506B and the non-emission period temporally adjacent to the particular emission period may be non-emission period 504B). In some examples, the particular emission period and the non-emission period temporally adjacent to the particular emission period may be in different frames. For instance, as shown in FIG. 11, the particular emission period may be emission period 506A and the non-emission period temporally adjacent to the particular emission period may be non-emission period 504C.

In some examples, to cause the one or more sensors to alternatingly emit the electromagnetic radiation during emission periods and non-emission periods, the controller may cause the one or more sensors to emit the electromagnetic radiation during an emission period of an Nth frame of the plurality of frames; and cause the one or more sensors to emit the electromagnetic radiation during a non-emission period of an N+1st frame of the plurality of frames.

Figure 13:
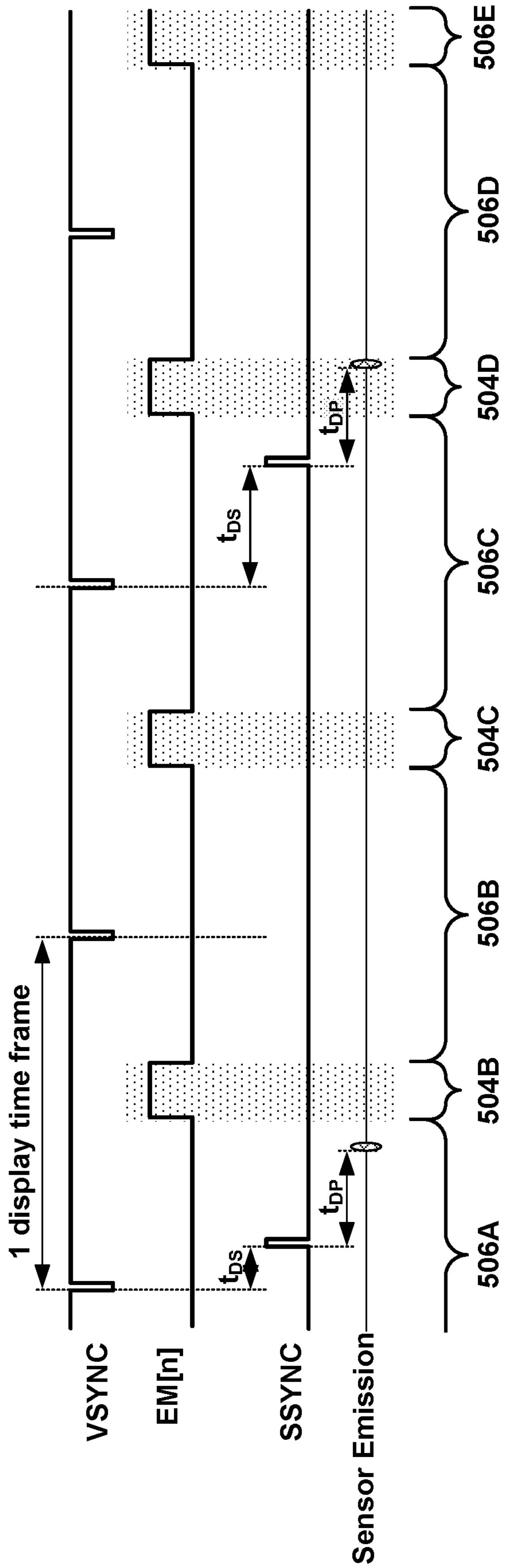
FIG. 13 is a conceptual diagram illustrating various signals of a display of a device with synchronized operation of under display electromagnetic emission, in accordance with one or more techniques of this disclosure.

FIG. 13 is a conceptual diagram illustrating various signals of a display of a device with synchronized operation of under display electromagnetic emission, in accordance with one or more techniques of this disclosure. As discussed above, in some examples, the controller may operate the one or more sensors at a sensor operation frequency that is less than the display frame frequency. In some examples, the reduced sensor operation frequency techniques may be combined with the alternating emission period/non-emission period operation. For instance, as shown in FIG. 13, the controller may cause the sensor to emit electromagnetic radiation during emission period 506A and then refrain from causing the sensor to emit electromagnetic radiation until non-emission period 504D.

Additionally or alternatively, the alternating emission period/non-emission period operation techniques may be combined with causing the one or more sensors to emit the electromagnetic radiation during a particular portion of the emission period of the frame. For instance, as shown in FIGS. 11-13, when causing the sensors to emit electromagnetic radiation during an emission period, the controller may cause the sensors to emit the electromagnetic radiation near an end of the emission period.

Additionally or alternatively, the alternating emission period/non-emission period operation techniques may be combined with causing the one or more sensors to emit the electromagnetic radiation during a particular portion of the emission period of the frame and the reduced sensor operation frequency. For instance, as shown in FIG. 13, the controller may all three of alternate emissions of electromagnetic radiation be the sensor between emission periods and non-emission periods at a reduced sensor operation frequency while causing the sensors to emit the electromagnetic radiation near an end of the selected emission periods.

Figure 14:
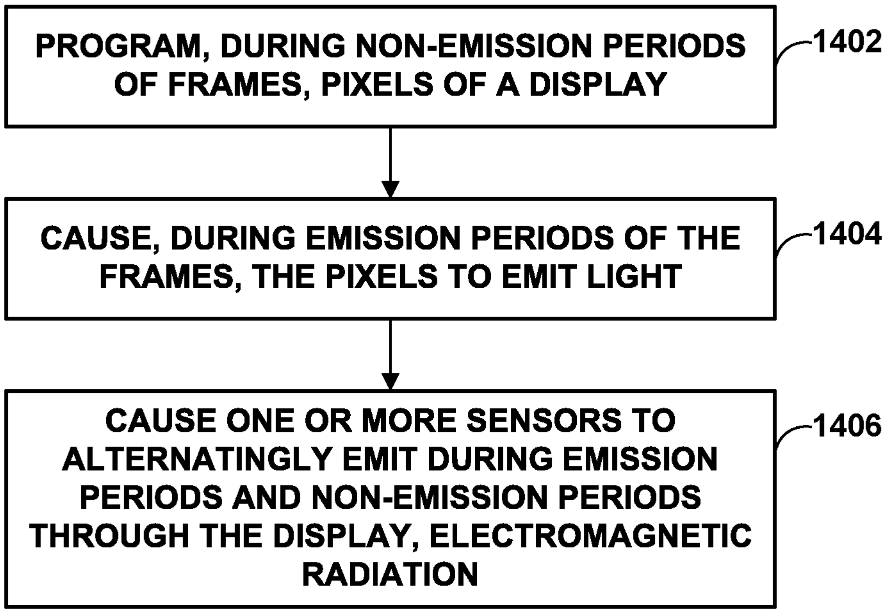
FIG. 14 is a flowchart illustrating a method for synchronizing operation of a display with operation of a sensor under the display, in accordance with one or more techniques of this disclosure.

FIG. 14 is a flowchart illustrating a method for synchronizing operation of a display with operation of a sensor under the display, in accordance with one or more techniques of this disclosure. While described in the context of device 100 of FIGS. 1A and 1B, other devices may perform the method of FIG. 14.

Device 100 may program, during non-emission periods, of frames, pixels of a display (1402). For instance, controller 206 of display 200 may program (e.g., via data drivers 210) gate voltages of one or more pixels of display 200 during a non-emission period of non-emission periods 504. As discussed above, controller 200 may program the pixels of display 200 line-by-line. As also discussed above, controller 200 may cause the control signal EM to be in a first logical state during the non-emission periods (e.g., logic high).

Device 100 may cause, during emission periods of the frames, the pixels to emit light (1404). For instance, during an emission period of emission periods 506, controller 206 may cause the pixels to emit an amount of light that is based on the programming for the particular frame (e.g., the amount of light emitted by a particular pixel may be a function of the gate voltage of a driver of the particular pixel). As also discussed above, controller 200 may cause the control signal EM to be in a second logical state during the non-emission periods (e.g., logic low).

In accordance with one or more techniques of this disclosure, device 100 may synchronize operation of one or more sensors and operation of the pixels. For instance, device 100 may cause sensor 120 to alternatingly emit, through the pixels of display 200, electromagnetic radiation during emission periods of emission periods 506 and non-emission periods of non-emission periods 504 (1406). By alternating emissions of sensor 120 between emission periods and non-emission periods of display 200, device 100 may cause alternating black and white dots (e.g., alternating increases and decreased in luminance). The alternating black and white dots may visually cancel each other out, thereby minimizing visible effects of sensor operation.

Figure 15:
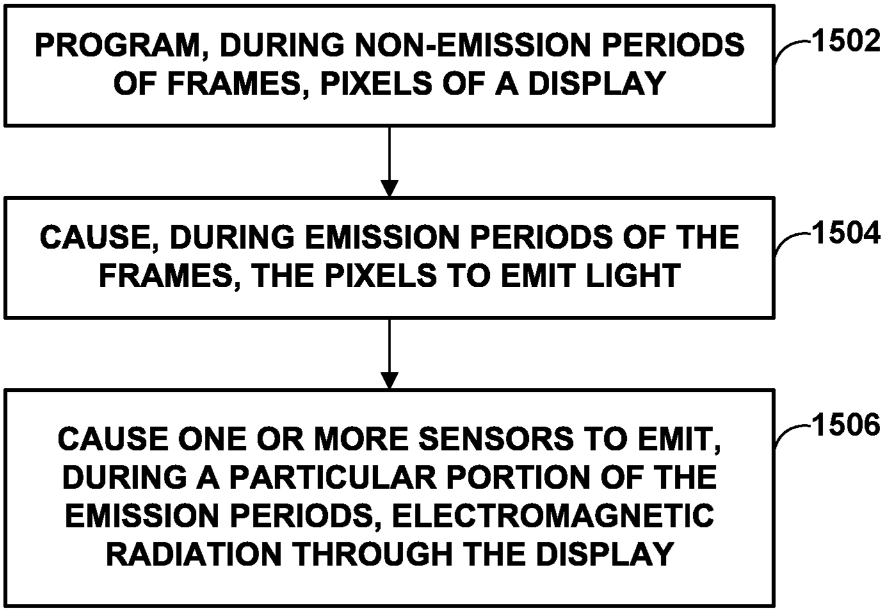
FIG. 15 is a flowchart illustrating a method for synchronizing operation of a display with operation of a sensor under the display, in accordance with one or more techniques of this disclosure.

FIG. 15 is a flowchart illustrating a method for synchronizing operation of a display with operation of a sensor under the display, in accordance with one or more techniques of this disclosure. While described in the context of device 100 of FIGS. 1A and 1B, other devices may perform the method of FIG. 15.

Device 100 may program, during non-emission periods, of frames, pixels of a display (1502). For instance, controller 206 of display 200 may program (e.g., via data drivers 210) gate voltages of one or more pixels of display 200 during a non-emission period of non-emission periods 504. As discussed above, controller 200 may program the pixels of display 200 line-by-line. As also discussed above, controller 200 may cause the control signal EM to be in a first logical state during the non-emission periods (e.g., logic high).

Device 100 may cause, during emission periods of the frames, the pixels to emit light (1504). For instance, during an emission period of emission periods 506, controller 206 may cause the pixels to emit an amount of light that is based on the programming for the particular frame (e.g., the amount of light emitted by a particular pixel may be a function of the gate voltage of a driver of the particular pixel). As also discussed above, controller 200 may cause the control signal EM to be in a second logical state during the non-emission periods (e.g., logic low).

In accordance with one or more techniques of this disclosure, device 100 may synchronize operation of one or more sensors and operation of the pixels. For instance, device 100 may cause sensor 120 to emit, during a particular portion of an emission period, electromagnetic radiation through the pixels of display 200 (1506). For instance, as shown in FIGS. 11-13, to causing sensor 120 to emit electromagnetic radiation during the particular portion of the emission period, controller 206 may cause sensor 120 to emit the electromagnetic radiation near an end of the emission period. As luminance value alteration effects of emission by sensor 120 during an emission period may be reset or undone during a following non-emission period, synchronizing operation of sensor 120 and display 200 in this way may minimizing visible effects of luminance value alteration.

The following numbered examples may illustrate one or more aspects of the disclosure:

Example 1. A computing device comprising: a display comprising a plurality of pixels; one or more sensors positioned underneath the display and configured to emit electromagnetic radiation through the display during operation; and one or more processors configured to: program the pixels of the plurality of pixels during non-emission periods of frames of a plurality of frames based on image data of the frames; cause pixels of the plurality of pixels to emit light during emission periods of the frames, wherein an amount of light emitted by the pixels during an emission period of a particular frame is based on the programming for the particular frame; and synchronize operation of the one or more sensors and operation of the plurality of pixels by at least causing the one or more sensors to alternatingly emit the electromagnetic radiation during emission periods and non-emission periods.

Example 2. The computing device of example 1, wherein, to cause the one or more sensors to alternatingly emit the electromagnetic radiation during emission periods and non-emission periods, the one or more processors are configured to: cause the one or more sensors to emit the electromagnetic radiation during an emission period of a frame of the plurality of frames; and refrain from causing the one or more sensors to emit the electromagnetic radiation during an emission period of a subsequent frame of the plurality of frames until after causing the one or more sensors to emit the electromagnetic radiation during a non-emission period.

Example 3. The computing device of example 1, wherein, to cause the one or more sensors to alternatingly emit the electromagnetic radiation during emission periods and non-emission periods, the one or more processors are configured to: cause the one or more sensors to emit the electromagnetic radiation during a particular emission period; and cause the one or more sensors to emit the electromagnetic radiation during a non-emission period temporally adjacent to the particular emission period.

Example 4. The computing device of example 3, wherein the particular emission period and the non-emission period temporally adjacent to the particular emission period are in a same frame.

Example 5. The computing device of example 3, wherein the particular emission period and the non-emission period temporally adjacent to the particular emission period are in different frames.

Example 6. The computing device of example 1, wherein, to cause the one or more sensors to alternatingly emit the electromagnetic radiation during emission periods and non-emission periods, the one or more processors are configured to: cause the one or more sensors to emit the electromagnetic radiation during an emission period of an Nth frame of the plurality of frames; and cause the one or more sensors to emit the electromagnetic radiation during a non-emission period of an N+1st frame of the plurality of frames.

Example 7. The computing device of example 1, wherein to cause the one or more sensors to emit the electromagnetic radiation during an emission period of the emission periods, the one or more processors are configured to cause the one or more sensors to emit the electromagnetic radiation during a particular portion of the emission period.

Example 8. The computing device of example 7, wherein to cause the one or more sensors to emit the electromagnetic radiation during the particular portion of the emission period, the one or more processors are configured to cause the one or more sensors to emit the electromagnetic radiation near an end of the emission period.

Example 9. The computing device of example 8, wherein, to cause the one or more sensors to emit the electromagnetic radiation near the end of the emission period, the one or more processors are configured to one or both of: cause the one or more sensors to emit the electromagnetic radiation during a final sub-portion of the emission period; and refrain from causing the one or more sensors to emit the electromagnetic radiation during portions of the emission period other than the final sub-period of the emission period.

Example 10. The computing device of example 9, wherein the final sub-portion of the emission period is a last 20% of the emission period.

Example 11. The computing device of example 7, wherein, to cause the one or more sensors to emit the electromagnetic radiation during the particular portion of the emission period, the one or more processors are configured to one or both of: cause the one or more sensors to emit the electromagnetic radiation after a predetermined delay period; and refrain from causing the one or more sensors to emit the electromagnetic radiation prior to an expiration of the predetermined delay period.

Example 12. The computing device of example 11, wherein the predetermined delay period is an amount of time from a particular point in the frame.

Example 13. The computing device of example 7, wherein to synchronize operation of the one or more sensors and operation of the plurality of pixels, the one or more processors are configured to operate the one or more sensors at a sensor operation frequency that is less than a display frame frequency.

Example 14. The computing device of example 13, wherein to operate the one or more sensors at the sensor operation frequency, the one or more processors are configured to one or both of: cause the one or more sensors to emit the electromagnetic radiation during a first sub-set of frames of the plurality of frames; and refrain from causing the one or more sensors to emit the electromagnetic radiation during a second sub-set of frames of the plurality of frames.

Example 15. The computing device of example 13, wherein the sensor operation frequency is an integer fraction of the display frame frequency.

Example 16. The computing device of example 15, wherein the sensor frequency is one-half of the display frame frequency, and wherein the first sub-set of frames includes one of even frames or odd frames and the second sub-set of frames includes the other of even frames or odd frames.

Example 17. The computing device of example 1, wherein, to program a particular pixel of the plurality of pixels, the one or more processors are configured to cause a circuit to store a voltage level that represents an emissive intensity of the particular pixel, and wherein the emission of the electromagnetic radiation by the one or more sensors modifies the stored voltage level.

Example 18. The computing device of example 1, wherein the electromagnetic radiation comprises one or more of infrared radiation, ultraviolet radiation, or radio-wave radiation.

Example 19. The computing device of example 1, wherein the display comprises an organic light emitting diode display (OLED).

Example 20. A method comprising: programming, during non-emission periods of frames of a plurality of frames based on image data of the frames, pixels of the plurality of pixels of a display of a computing device; causing, during emission periods of the frames, pixels of the plurality of pixels to emit light, wherein an amount of light emitted by the pixels during an emission period of a particular frame is based on the programming for the particular frame; and synchronizing operation of one or more sensors and operation of the plurality of pixels by at least causing the one or more sensors to alternatingly emit, through the display, electromagnetic radiation during emission periods and non-emission periods.

Example 21. The method of example 20, wherein causing the one or more sensors to alternatingly emit the electromagnetic radiation during emission periods and non-emission periods comprises: causing the one or more sensors to emit the electromagnetic radiation during an emission period of a frame of the plurality of frames; and refraining from causing the one or more sensors to emit the electromagnetic radiation during an emission period of a subsequent frame of the plurality of frames until after causing the one or more sensors to emit the electromagnetic radiation during a non-emission period.

Example 22. The method of example 20, wherein causing the one or more sensors to alternatingly emit the electromagnetic radiation during emission periods and non-emission periods comprises: causing the one or more sensors to emit the electromagnetic radiation during a particular emission period; and causing the one or more sensors to emit the electromagnetic radiation during a non-emission period temporally adjacent to the particular emission period.

Example 23. The method of example 22, wherein the particular emission period and the non-emission period temporally adjacent to the particular emission period are in a same frame.

Example 24. The method of example 23, wherein the particular emission period and the non-emission period temporally adjacent to the particular emission period are in different frames.

Example 25. The method of example 20, wherein causing the one or more sensors to alternatingly emit the electromagnetic radiation during emission periods and non-emission periods causing: causing the one or more sensors to emit the electromagnetic radiation during an emission period of an Nth frame of the plurality of frames; and causing the one or more sensors to emit the electromagnetic radiation during a non-emission period of an N+1st frame of the plurality of frames.

Example 26. The method of example 20, wherein causing the one or more sensors to emit the electromagnetic radiation during an emission period of the emission periods comprises causing the one or more sensors to emit the electromagnetic radiation during a particular portion of the emission period.

Example 27. The method of example 26, wherein causing the one or more sensors to emit the electromagnetic radiation during the particular portion of the emission period comprises causing the one or more sensors to emit the electromagnetic radiation near an end of the emission period.

Example 28. The method of example 27, wherein causing the one or more sensors to emit the electromagnetic radiation near the end of the emission period comprises one or both of: causing the one or more sensors to emit the electromagnetic radiation during a final sub-portion of the emission period; and refraining from causing the one or more sensors to emit the electromagnetic radiation during portions of the emission period other than the final subperiod of the emission period.

Example 29. The method of example 28, wherein the final sub-portion of the emission period is a last 20% of the emission period.

Example 30. The method of example 26, wherein causing the one or more sensors to emit the electromagnetic radiation during the particular portion of the emission period comprises one or both of: causing the one or more sensors to emit the electromagnetic radiation after a predetermined delay period; and refraining from causing the one or more sensors to emit the electromagnetic radiation prior to an expiration of the predetermined delay period.

Example 31. The method of example 30, wherein the predetermined delay period is an amount of time from a particular point in the frame.

Example 32. The method of example 26, wherein synchronizing operation of the one or more sensors and operation of the plurality of pixels comprises operating the one or more sensors at a sensor operation frequency that is less than a display frame frequency.

Example 33. The method of example 32, wherein operating the one or more sensors at the sensor operation frequency comprises one or both of: causing the one or more sensors to emit the electromagnetic radiation during a first sub-set of frames of the plurality of frames; and refraining from causing the one or more sensors to emit the electromagnetic radiation during a second sub-set of frames of the plurality of frames.

Example 34. The method of example 32, wherein the sensor operation frequency is an integer fraction of the display frame frequency.

Example 35. The method of example 34, wherein the sensor frequency is one-half of the display frame frequency, and wherein the first sub-set of frames includes one of even frames or odd frames and the second sub-set of frames includes the other of even frames or odd frames.

Example 36. The method of example 20, wherein programming a particular pixel of the plurality of pixels comprises causing a circuit to store a voltage level that represents an emissive intensity of the particular pixel, and wherein the emission of the electromagnetic radiation by the one or more sensors modifies the stored voltage level.

Example 37. The method of example 20, wherein the electromagnetic radiation comprises one or more of infrared radiation, ultraviolet radiation, or radiowave radiation.

Example 38. The method of example 20, wherein the display comprises an organic light emitting diode display (OLED).

Example 39. A computer-readable storage medium storing instructions that, when executed, cause one or more processors of a computing device to perform the method of any of examples 20-38.

Example 40. A device comprising: a display comprising a plurality of pixels; one or more sensors positioned underneath the display and configured to emit electromagnetic radiation through the display during operation; and means for performing the method of any of examples 20-38.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The computing device may include various components such as a memory, a processor, a display, and input/output units. The input/output units may include, for example, a transceiver which can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

One or more aspects of the techniques may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computing device comprising:

a display comprising a plurality of pixels;

one or more sensors positioned underneath the display and configured to emit electromagnetic radiation through the display during operation; and one or more processors configured to:

program the pixels of the plurality of pixels during non-emission periods of frames of a plurality of frames based on image data of the frames;

cause pixels of the plurality of pixels to emit light during emission periods of the frames, wherein an amount of light emitted by the pixels during an emission period of a particular frame is based on the programming for the particular frame; and synchronize operation of the one or more sensors and operation of the plurality of pixels by at least causing the one or more sensors to alternatingly emit the electromagnetic radiation during emission periods and non-emission periods, wherein, to cause the one or more sensors to alternatingly emit the electromagnetic radiation during emission periods and non-emission periods, the one or more processors are configured to:

cause the one or more sensors to emit the electromagnetic radiation during a particular emission period; and cause the one or more sensors to emit the electromagnetic radiation during a non-emission period temporally adjacent to the particular emission period.

2. The computing device of claim 1, wherein the particular emission period and the non-emission period temporally adjacent to the particular emission period are in a same frame.

3. The computing device of claim 1, wherein the particular emission period and the non-emission period temporally adjacent to the particular emission period are in different frames.

4. The computing device of claim 1, wherein to cause the one or more sensors to emit the electromagnetic radiation during an emission period of the emission periods, the one or more processors are configured to cause the one or more sensors to emit the electromagnetic radiation during a particular portion of the emission period.

5. The computing device of claim 4, wherein to cause the one or more sensors to emit the electromagnetic radiation during the particular portion of the emission period, the one or more processors are configured to cause the one or more sensors to emit the electromagnetic radiation near an end of the emission period.

6. The computing device of claim 5, wherein, to cause the one or more sensors to emit the electromagnetic radiation near the end of the emission period, the one or more processors are configured to one or both of:

cause the one or more sensors to emit the electromagnetic radiation during a final sub-portion of the emission period; and refrain from causing the one or more sensors to emit the electromagnetic radiation during portions of the emission period other than the final sub-portion of the emission period.

7. The computing device of claim 6, wherein the final sub-portion of the emission period is a last 20% of the emission period.

8. The computing device of claim 4, wherein, to cause the one or more sensors to emit the electromagnetic radiation during the particular portion of the emission period, the one or more processors are configured to one or both of:

cause the one or more sensors to emit the electromagnetic radiation after a predetermined delay period; and refrain from causing the one or more sensors to emit the electromagnetic radiation prior to an expiration of the predetermined delay period.

9. The computing device of claim 8, wherein the predetermined delay period is an amount of time from a particular point in the frame.

10. The computing device of claim 4, wherein to synchronize operation of the one or more sensors and operation of the plurality of pixels, the one or more processors are configured to operate the one or more sensors at a sensor operation frequency that is less than a display frame frequency.

11. The computing device of claim 10, wherein to operate the one or more sensors at the sensor operation frequency, the one or more processors are configured to one or both of:

cause the one or more sensors to emit the electromagnetic radiation during a first sub-set of frames of the plurality of frames; and refrain from causing the one or more sensors to emit the electromagnetic radiation during a second sub-set of frames of the plurality of frames.

12. The computing device of claim 11, wherein the sensor operation frequency is an integer fraction of the display frame frequency.

13. The computing device of claim 12, wherein the sensor operation frequency is one-half of the display frame frequency, and wherein the first sub-set of frames includes one of even frames or odd frames and the second sub-set of frames includes the other of even frames or odd frames.

14. The computing device of claim 1, wherein, to program a particular pixel of the plurality of pixels, the one or more processors are configured to cause a circuit to store a voltage level that represents an emissive intensity of the particular pixel, and wherein the emission of the electromagnetic radiation by the one or more sensors modifies the stored voltage level.

15. The computing device of claim 1, wherein the electromagnetic radiation comprises one or more of infrared radiation, ultraviolet radiation, or radiowave radiation.

16. The computing device of claim 1, wherein the display comprises an organic light emitting diode display (OLED).

17. A method comprising:

programming, during non-emission periods of frames of a plurality of frames based on image data of the frames, pixels of a plurality of pixels of a display of a computing device;

causing, during emission periods of the frames, pixels of the plurality of pixels to emit light, wherein an amount of light emitted by the pixels during an emission period of a particular frame is based on the programming for the particular frame; and synchronizing operation of one or more sensors and operation of the plurality of pixels by at least causing the one or more sensors to alternatingly emit, through the display, electromagnetic radiation during emission periods and non-emission periods, wherein causing the one or more sensors to alternatingly emit the electromagnetic radiation during emission periods and non-emission periods comprises:

causing the one or more sensors to emit the electromagnetic radiation during an emission period of a frame of the plurality of frames; and refraining from causing the one or more sensors to emit the electromagnetic radiation during an emission period of a subsequent frame of the plurality of frames until after causing the one or more sensors to emit the electromagnetic radiation during a non-emission period.

18. The method of claim 17, wherein causing the one or more sensors to alternatingly emit the electromagnetic radiation during emission periods and non-emission periods causing:

causing the one or more sensors to emit the electromagnetic radiation during an emission period of an Nth frame of the plurality of frames; and causing the one or more sensors to emit the electromagnetic radiation during a non-emission period of an N+1st frame of the plurality of frames.

19. The method of claim 17, wherein causing the one or more sensors to emit the electromagnetic radiation during an emission period of the emission periods comprises causing the one or more sensors to emit the electromagnetic radiation during a particular portion of the emission period.

20. The method of claim 19, wherein causing the one or more sensors to emit the electromagnetic radiation during the particular portion of the emission period comprises causing the one or more sensors to emit the electromagnetic radiation near an end of the emission period.

21. The method of claim 20, wherein causing the one or more sensors to emit the electromagnetic radiation near the end of the emission period comprises one or both of:

causing the one or more sensors to emit the electromagnetic radiation during a final sub-portion of the emission period; and refraining from causing the one or more sensors to emit the electromagnetic radiation during portions of the emission period other than the final sub-portion of the emission period.

22. The method of claim 21, wherein the final sub-portion of the emission period is a last 20% of the emission period.

23. The method of claim 19, wherein causing the one or more sensors to emit the electromagnetic radiation during the particular portion of the emission period comprises one or both of:

causing the one or more sensors to emit the electromagnetic radiation after a predetermined delay period; and refraining from causing the one or more sensors to emit the electromagnetic radiation prior to an expiration of the predetermined delay period.

24. A computing device comprising:

a display comprising a plurality of pixels;

one or more sensors positioned underneath the display and configured to emit electromagnetic radiation through the display during operation; and one or more processors configured to:

program the pixels of the plurality of pixels during non-emission periods of frames of a plurality of frames based on image data of the frames;

cause pixels of the plurality of pixels to emit light during emission periods of the frames, wherein an amount of light emitted by the pixels during an emission period of a particular frame is based on the programming for the particular frame; and synchronize operation of the one or more sensors and operation of the plurality of pixels by at least causing the one or more sensors to alternatingly emit the electromagnetic radiation during emission periods and non-emission periods, wherein, to cause the one or more sensors to alternatingly emit the electromagnetic radiation during emission periods and non-emission periods, the one or more processors are configured to:

cause the one or more sensors to emit the electromagnetic radiation during an emission period of an Nth frame of the plurality of frames; and cause the one or more sensors to emit the electromagnetic radiation during a non-emission period of an N+1st frame of the plurality of frames.

25. The computing device of claim 24, wherein to cause the one or more sensors to emit the electromagnetic radiation during an emission period of the emission periods, the one or more processors are configured to cause the one or more sensors to emit the electromagnetic radiation during a particular portion of the emission period.

26. The computing device of claim 25, wherein, to cause the one or more sensors to emit the electromagnetic radiation during the particular portion of the emission period, the one or more processors are configured to one or both of:

cause the one or more sensors to emit the electromagnetic radiation after a predetermined delay period; and refrain from causing the one or more sensors to emit the electromagnetic radiation prior to an expiration of the predetermined delay period.

27. The computing device of claim 25, wherein to synchronize operation of the one or more sensors and operation of the plurality of pixels, the one or more processors are configured to operate the one or more sensors at a sensor operation frequency that is less than a display frame frequency.

28. The computing device of claim 24, wherein, to program a particular pixel of the plurality of pixels, the one or more processors are configured to cause a circuit to store a voltage level that represents an emissive intensity of the particular pixel, and wherein the emission of the electromagnetic radiation by the one or more sensors modifies the stored voltage level.

* * * * *